United States Patent
Roy

(10) Patent No.: US 9,501,747 B2
(45) Date of Patent: Nov. 22, 2016

(54) SYSTEMS AND METHODS THAT FORMULATE EMBEDDINGS OF PROBLEMS FOR SOLVING BY A QUANTUM PROCESSOR

(71) Applicant: D-Wave Systems Inc., Burnaby (CA)

(72) Inventor: Aidan Patrick Roy, Surrey (CA)

(73) Assignee: D-Wave Systems Inc., Burnaby (CA)

( * ) Notice: Subject to any disclaimer, the term of this patent is extended or adjusted under 35 U.S.C. 154(b) by 341 days.

(21) Appl. No.: 14/109,663

(22) Filed: Dec. 17, 2013

(65) Prior Publication Data

US 2014/0250288 A1 Sep. 4, 2014

Related U.S. Application Data

(60) Provisional application No. 61/738,961, filed on Dec. 18, 2012, provisional application No. 61/857,993, filed on Jul. 24, 2013.

(51) Int. Cl.
*G06N 99/00* (2010.01)
*B82Y 10/00* (2011.01)

(52) U.S. Cl.
CPC .............. *G06N 99/002* (2013.01); *B82Y 10/00* (2013.01)

(58) Field of Classification Search
None
See application file for complete search history.

(56) References Cited

U.S. PATENT DOCUMENTS

| | | | |
|---|---|---|---|
| 7,135,701 B2 | 11/2006 | Amin et al. | |
| 7,418,283 B2 | 8/2008 | Amin | |
| 7,533,068 B2 | 5/2009 | Maassen van den Brink et al. | |
| 7,788,192 B2 | 8/2010 | Amin | |
| 7,870,087 B2 | 1/2011 | Macready et al. | |
| 7,876,248 B2 | 1/2011 | Berkley et al. | |
| 7,984,012 B2 | 7/2011 | Coury et al. | |
| 8,008,942 B2 | 8/2011 | van Den Brink et al. | |
| 8,032,474 B2 | 10/2011 | Macready et al. | |
| 8,035,540 B2 | 10/2011 | Berkley et al. | |
| 8,073,808 B2 | 12/2011 | Rose | |
| 8,174,305 B2 | 5/2012 | Harris | |
| 8,190,548 B2 | 5/2012 | Choi | |
| 8,195,596 B2 | 6/2012 | Rose et al. | |

(Continued)

FOREIGN PATENT DOCUMENTS

WO 2012/064974 A2 5/2012
WO 2013/006836 A1 1/2013

OTHER PUBLICATIONS

Choi, V. "Minor-embedding in adiabatic quantum computation: I. The parameter setting problem." Quantum Information Processing 7.5 (2008): 193-209.*

(Continued)

*Primary Examiner* — Kakali Chaki
*Assistant Examiner* — Eric Nilsson
(74) *Attorney, Agent, or Firm* — Seed IP Law Group LLP

(57) ABSTRACT

Systems and methods allow formulation of embeddings of problems via targeted hardware (e.g., particular quantum processor). In a first stage, sets of connected subgraphs are successively generated, each set including a respective subgraph for each decision variable in the problem graph, adjacent decisions variables in the problem graph mapped to respective vertices in the hardware graph, the respective vertices which are connected by at least one respective edge in the hardware graph. In a second stage, the connected subgraphs are refined such that no vertex represents more than a single decision variable.

34 Claims, 12 Drawing Sheets

(56) References Cited

U.S. PATENT DOCUMENTS

| | | |
|---|---|---|
| 8,244,662 B2 | 8/2012 | Coury et al. |
| 2008/0052055 A1 | 2/2008 | Rose et al. |
| 2008/0218519 A1* | 9/2008 | Coury .................. G06T 11/206 345/440 |
| 2011/0022820 A1 | 1/2011 | Bunyk et al. |
| 2011/0231462 A1 | 9/2011 | Macready et al. |

OTHER PUBLICATIONS

Bunyk, P. D-Wave processor control circuitry. 2009. <retrieved from dwave.files.wordpress.com/2009/11/sce_d-wave_2009.pdf>. <retrieved on Jan. 20, 2016>.*

Choi, Vicky. "Minor-embedding in adiabatic quantum computation: II. Minor-universal graph design." Quantum Information Processing 10.3 (2011): 343-353.*

Amin, "Effect of Local Minima on Adiabatic Quantum Optimization," arXiv:0709.0528v2 [quant-ph] Apr. 4, 2008, 4 pages.

Macready et al., "Systems and Methods that Formulate Problems for Solving by a Quantum Processor Using Hardware Graph Decomposition," U.S. Appl. No. 14/109,657, filed Dec. 17, 2013, 51 pages.

Klymko et al., "Adiabatic Quantum Programming: Minor Embedding With Hard Faults," arXiv:1210.8395v2 [quant-ph], Nov. 7, 2012, 12 pages.

Macready et al., "Systems and Methods That Formulate Problems for Solving by a Quantum Processor Using Hardware Graph Decomposition," Office Action, dated Feb. 8, 2016, for U.S. Appl. No. 14/109,657, 16 pages.

Macready et al., "Systems and Methods That Formulate Problems for Solving by a Quantum Processor," U.S. Appl. No. 61/857,993, filed Jul. 24, 2013, 87 pages.

* cited by examiner

SYSTEMS AND METHODS THAT FORMULATE EMBEDDINGS OF PROBLEMS FOR SOLVING BY A QUANTUM PROCESSOR

BACKGROUND

Field

The present systems and methods generally relate to use of quantum processors, and particularly relate to the use of quantum processors to minimize an objective function.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is given by:

$$H_e = (1-s)H_i + sH_f$$

where $H_i$ is the initial Hamiltonian, $H_f$ is the final Hamiltonian, $H_e$ is the evolution or instantaneous Hamiltonian, and s is an evolution coefficient which controls the rate of evolution. As the system evolves, the evolution coefficient s goes from 0 to 1 such that at the beginning (i.e., s=0) the evolution Hamiltonian $H_e$ is equal to the initial Hamiltonian $H_i$ and at the end (i.e., s=1) the evolution Hamiltonian $H_e$ is equal to the final Hamiltonian $H_f$. Before the evolution begins, the system is typically initialized in a ground state of the initial Hamiltonian $H_i$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems and methods, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The rate that s changes, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in, for example, U.S. Pat. Nos. 7,135,701 and 7,418,283.

Quantum Annealing

Quantum annealing is a computation method that may be used to find a low-energy state, typically preferably the ground state, of a system. Somewhat similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly than classical annealing. It is known that the solution to a hard problem, such as a combinatorial optimization problem, may be encoded in the ground state of a system Hamiltonian (e.g., the Hamiltonian of an Ising spin glass) and therefore quantum annealing may be used to find the solution to such a hard problem. Adiabatic quantum computation may be considered a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to quantum annealing is intended to encompass adiabatic quantum computation unless the context requires otherwise.

Quantum annealing uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in the global minimum (i.e., the exact solution), or in a local minimum close to the exact solution. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

Quantum Processor

A quantum processor may take the form of a superconducting quantum processor. A superconducting quantum processor may include a number of qubits and associated local bias devices, for instance two or more superconducting qubits. A superconducting quantum processor may also employ coupling devices (i.e., "couplers") providing communicative coupling between qubits. Further details and embodiments of exemplary quantum processors that may be used in conjunction with the present systems and methods are described in, for example, U.S. Pat. Nos. 7,533,068, 8,008,942, US Patent Publication 2008-0176750 (now U.S.

Pat. No. 8,195,596), US Patent Publication 2009-0121215 (now U.S. Pat. No. 8,190,548), and US Patent Publication 2011-0022820.

The types of problems that may be solved by any particular embodiment of a quantum processor, as well as the relative size and complexity of such problems, typically depend on many factors. Two such factors may include the number of qubits in the quantum processor and the connectivity (i.e., the availability of communicative couplings) between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of directly communicably coupling to up to three other qubits without any intervening qubits. In other words, there are direct communicative coupling paths available to three other qubits, although in any particular application all or less than all of those communicative coupling paths may be employed. In a quantum processor employing coupling devices between qubits, this would mean a qubit having a connectivity of three is selectively communicably coupleable to each of three other qubits via a respective one of three coupling devices. Typically, the number of qubits in a quantum processor limits the size of problems that may be solved and the connectivity between the qubits in a quantum processor limits the complexity of the problems that may be solved.

Many techniques for using adiabatic quantum computation and/or quantum annealing to solve computational problems involve finding ways to directly map a representation of a problem to the quantum processor itself. For example, US Patent Publication 2008-0052055 describes solving a protein folding problem by first casting the protein folding problem as an Ising spin glass problem and then directly mapping the Ising spin glass problem to a quantum processor, and US Patent Publication 2008-0260257 (now U.S. Pat. No. 8,073,808) describes solving a computational problem (e.g., an image-matching problem) by first casting the problem as a quadratic unconstrained binary optimization ("QUBO") problem and then mapping the QUBO problem directly to a quantum processor. In both cases, a problem is solved by first casting the problem in a contrived formulation (e.g., Ising spin glass, QUBO, etc.) because that particular formulation maps directly to the particular embodiment of the quantum processor being employed. In other words, an intermediate formulation is used to re-cast the original problem into a form that accommodates the number of qubits and/or connectivity constraints in the particular quantum processor and then the intermediate formulation is directly mapped to the quantum processor. This "direct mapping" approach is motivated, at least in part, by limitations inherent in the architecture of the quantum processor being employed. For example, a quantum processor that employs only pair-wise interactions between qubits (i.e., a quantum processor employing coupling devices that provide communicative coupling between respective pairs of qubits but not, for example, between larger sets of qubits, such as three or more qubits) is intrinsically well-suited to solve problems having quadratic terms (e.g., QUBO problems) because quadratic terms in a problem map directly to pair-wise interactions between qubits in the quantum processor.

The approach of re-casting a problem in an intermediate formulation and then directly mapping the intermediate formulation to the quantum processor can be impractical for some types of problems. For example, for a quantum processor architecture that inherently solves quadratic (e.g., QUBO) problems because it employs only pair-wise couplings between qubits, casting a generic computational problem as a QUBO problem requires casting the generic computational problem in a form having only pair-wise interactions between qubits. Any higher-order interactions that may exist in the original problem need to be broken down into pair-wise terms in order to be re-cast in QUBO form. Many computational problems have higher-order (i.e., beyond pair-wise) interactions between variables, and these problems can require significant pre-processing in order to be re-cast in QUBO form. Indeed, the pre-processing required to re-cast a generic problem in QUBO form and directly map the corresponding QUBO problem to a quantum processor can, in some cases, be of similar computational complexity to the original problem. Furthermore, breaking down higher-order interactions into pair-wise terms can force multiple qubits to be used to represent the same variable, meaning the size of the problem that can be solved is reduced.

Clearly, these "direct mapping" techniques for interacting with quantum processors limit the type, size, and complexity of problems that can be solved. There is a need in the art for techniques of using quantum processors that are less dependent on the architecture of the processors themselves and enable a broader range of problems to be solved.

Quadratic Unconstrained Binary Optimization Problems

A quadratic unconstrained binary optimization ("QUBO") problem is a form of discrete optimization problem that involves finding a set of N binary variables $\{x_i\}$ that minimizes an objective function of the form:

$$E(x_1, \ldots, x_N) = \sum_{i \leq j}^{N} Q_{ij} x_i x_j$$

where Q is typically a real-valued upper triangular matrix that is characteristic of the particular problem instance being studied. QUBO problems arise in many different fields, for example machine learning, pattern matching, and statistical mechanics, to name a few.

Programming a Quantum Processor

A quantum processor may interact with a digital computer and may be programmed and/or operated via instructions sent from the digital computer. However, the way in which the quantum processor is programmed, and how its operation is involved in an algorithm for solving a problem, may depend on many factors. As described in PCT Patent Application Serial No. PCT/US2012/045843 and in accordance with the present systems and methods, a quantum processor may be programmed and operated to determine a solution to a computational problem via at least two approaches: a direct mapping approach and a sampling approach.

Direct Mapping Approach

A problem may comprise a number of variables, and using the direct mapping approach to solve the problem, each variable may be mapped to and/or represented by at least one qubit in a quantum processor. The types of problems that may be solved by this approach, as well as the relative size and complexity of such problems, typically depend on many factors. Two such factors may include the number of qubits in the quantum processor and the connectivity between the qubits in the quantum processor. Throughout this specification, the term "connectivity" is used to describe the maximum number of possible communicative coupling paths that are physically available (e.g., whether active or not) to communicably couple between individual qubits in a quantum processor without the use of intervening qubits. For example, a qubit with a connectivity of three is capable of communicably coupling to up to three other qubits without any intervening qubits. In other words, there are communicative paths directly available to three other qubits, while in any particular application any number (i.e., 0, 1, 2, or 3) of those communicative paths may be employed. In a quantum processor employing coupling devices between qubits, this would mean a qubit having a connectivity of three is communicably directly coupleable to three other quits via three respective coupling devices. Traditionally, the number of qubits in a quantum processor limits the size of problems that may be solved and the connectivity between the qubits in a quantum processor limits the complexity of the problems that may be solved.

Examples of applications that employ the direct mapping approach include: US Patent Publication 2008-0052055, which describes solving a protein folding problem by first casting the protein folding problem as an Ising spin glass problem and then directly mapping the Ising spin glass problem to a quantum processor, U.S. Pat. No. 8,073,808, which describes solving a computational problem (e.g., an image-matching problem) by first casting the problem as a quadratic unconstrained binary optimization ("QUBO") problem and then mapping the QUBO problem directly to a quantum processor, and US Patent Publication 2011-0231462, which describes solving logic circuit representations of computational problems by mapping each individual logic gate to a respective miniature optimization problem having an output that is "optimized" if the truth table of the logic gate is satisfied. In all of these examples, a problem is solved by first casting the problem in a contrived formulation (e.g., Ising spin glass, QUBO, etc.) because that particular formulation maps directly to the particular embodiment of the quantum processor. In other words, an intermediate formulation is used to re-cast the original problem into a form that accommodates the number of qubits and/or connectivity constraints in the particular quantum processor.

Techniques for performing direct mapping of a problem to a quantum processor (e.g., techniques generating for generating an intermediate formulation, such as a QUBO problem) are described in at least U.S. Pat. Nos. 7,418,283, 7,135,701, 7,788,192, 7,533,068, 8,008,942, 7,984,012, 8,244,662, 8,190,548, 8,174,305, and US Patent Publication 2011-0231462, each of which is incorporated herein by reference in its entirety.

The "direct mapping" approach of re-casting a problem in an intermediate formulation can work well for some problems but can also be impractical for other problems. For example, casting a computational problem as a QUBO problem requires casting the computational problem in a form allowing only pair-wise interactions between qubits. Any higher-order interactions need to be broken down into pair-wise terms in order to be re-cast in QUBO form. Many computational problems have higher-order (i.e., beyond pair-wise) interactions between variables, and these problems can require significant pre-processing in order to be re-cast in QUBO form. Furthermore, breaking down higher-order interactions into pair-wise terms can force multiple qubits to be used to represent the same variable, meaning the size of the problem that can be solved is reduced. It is for at least these reasons that the alternative "sampling approach" to programming quantum processors has been developed.

Sampling Approach

The sampling approach to programming a quantum processor is described in PCT Patent Application Serial No. PCT/US2012/045843, which is hereby incorporated by reference in its entirety.

In brief, the sampling approach to programming a quantum processor involves using a digital computer to define an objective function which takes, as input, a bit string (i.e., a sequence of 0s and 1s) and outputs a real number. The quantum processor is called to provide a set of bit strings, or "samples," where each bit in the bit string corresponds to the state of a respective qubit in the quantum processor after a quantum computation/operation/algorithm is performed. The quality of each sample is then assessed by plugging it into the objective function on the digital computer to determine the corresponding real number output. The quantum processor intrinsically provides samples from a probability distribution, where the shape of the probability distribution depends on a configuration of programmable parameters (i.e., the same programmable parameters that are used to define a QUBO in the direct mapping approach). High probability samples in the quantum processor's probability distribution may correspond to low-energy states of the quantum processor. In other words, the quantum processor may intrinsically tend to provide samples from low-energy states (e.g., by performing adiabatic quantum computation and/or quantum annealing). The focus of the sampling approach to programming a quantum processor is to make these low-energy states of the quantum processor correspond to bit strings that produce desirable real number outputs in the objective function. This may be achieved by shaping the probability distribution of the quantum processor so that high-probability samples (e.g., low-energy states) correspond to bit strings that produce desirable real number outputs from the objective function. Thus, after the first samples from the quantum processor are assessed by determining their corresponding real number outputs, the programmable parameters of the quantum processor may be adjusted to re-shape the probability distribution of the quantum processor and increase the probability of producing desirable real number outputs and/or increase the desirability of at least some of the real number outputs produced.

Compared to the direct mapping approach, the sampling approach to programming a quantum processor is less dependent on the architecture of the processor itself and may enable a broader range of problems to be solved. In many applications, it can also be considerably more straightforward to program a quantum processor via the sampling approach than via the direct mapping approach.

BRIEF SUMMARY

Methods of formulating a problem to facilitate determining a solution via a quantum processor are described. Systems that perform the methods are also described.

A method for use in embedding a problem in a target processor, the problem represented as a problem graph having a number of decision variables and the target processor represented as a hardware graph having a plurality of vertices coupleable via a number of edges may be summarized as including in a first stage, successively generating a number of sets of connected subgraphs, each set including a respective subgraph for each decision variable in the problem graph, where adjacent decisions variables in the problem graph are mapped to respective vertices in the hardware graph, the respective vertices which are connected by at least one respective edge in the hardware graph; and in a second stage, following the first stage, refining the connected subgraphs created in the first stage such that no vertex represents more than a single decision variable. Successively generating a number of sets of connected subgraphs may include using only unused vertices in the hardware graph to represent the decision variables if an unused vertex in the hardware graph is available. Successively generating a number of sets of connected subgraphs may include using used vertices in the hardware graph to represent the decision variables if no unused vertex in the hardware graph is available. Successively generating a number of sets of connected subgraphs may include using a weighted shortest path determination to find a shortest path that uses only unused vertices of the hardware graph. Using a weighted shortest path determination may include, for each of at least some of the hardware vertices, exponentially increasing a weight associated with the respective hardware vertex as a function of a total number of decision variables represented by the respective hardware vertex. Using a weighted shortest path determination may include, for each of at least some of the hardware vertices, exponentially increasing a weight associated with the respective hardware vertex as a function of a fixed value greater than one and a total number of decision variables represented by the respective hardware vertex. Using a weighted shortest path calculation may include, for each of at least some of the hardware vertices, exponentially increasing a weight associated with the respective hardware vertex as a function of a fixed value between 2 and 10 and a total number of decision variables represented by the respective hardware vertex. Using a weighted shortest path calculation may include, for each of at least some of the hardware vertices, may exponentially increasing a weight associated with the respective hardware vertex in accordance with a function given by $$wt(g) := \alpha^{|\{i: g \in S_i\}|},$$

where $\alpha$ is greater than 1.

Refining the connected subgraphs may include iteratively for each of the decision variables, in an defined order, removing the connected subgraph which represents the respective decision variable from the mapping of the problem graph to the hardware graph; and generating a replacement connected subgraph for the respective decision variable; and after completing the removing of the connected subgraph and the generating of the replacement connected subgraph for each of the decision variables, determining whether the mapping of the problem graph to the hardware graph is improved relative to at least one previous mapping of the problem graph to the hardware graph. Determining whether the mapping of the problem graph to the hardware graph is improved relative to at least one previous mapping of the problem graph to the hardware graph may include comparing a largest number of decision variable represented at single vertex which single vertex has the largest number of variables represented of all of the vertices of the hardware graph for each of at least two different mappings of the problem graph to the hardware graph. Determining whether the mapping of the problem graph to the hardware graph is improved relative to at least one previous mapping of the problem graph to the hardware graph may include comparing a total sum of lengths of the connected subgraphs for each of at least two different mappings of the problem graph to the hardware graph. Determining whether the mapping of the problem graph to the hardware graph is improved relative to at least one previous mapping of the problem graph to the hardware graph may include comparing a length of a longest one of the connected subgraphs for each of at least two different mappings of the problem graph to the hardware graph.

The method may further include for each of the decision variables, storing information to at least one nontransitory processor-readable medium that identifies the connected subgraphs that represent the respective decision variable; and storing information to at least one nontransitory processor-readable medium that specifies the paths in the hardware graph that represent each edge in the problem graph.

The method may further include based at least in part on stored information, removing at least a portion of an adjacent connected subgraph which is adjacent to one of the connected subgraphs which is being removed.

The method may further include determining whether there are any vertices in the hardware graph which represent more than on decision variable in the mapping; determining whether a total number of iterations has exceeded a define number of iterations; and terminating the method if at the first of determining that there are no vertices in the hardware graph which represent more than on decision variable in the mapping or the defined number of iterations has been reached.

The problem graph may be a quadratic unconstrained binary optimization (QUBO) graph, the target processor may be at least one quantum processor that includes a plurality of qubits and a plurality of couplers, the couplers selectively operable to couple selected ones of the qubits to one another, and may further include embedding the QUBO graph onto the quantum processor. The hardware graph may be a Chimera graph, the at least one processor may include a digital processor, and successively generating a number of sets of connected subgraphs may include successively generating the sets of connected subgraphs in tiles of the Chimera graph by the digital processor. Successively generating a number of sets of connected subgraphs may include determining by the at least one processor whether a respective vertex appears in more than one shortest connected subgraph; and if the respective vertex appears in more than one shortest connected subgraph, adding the vertex to a connected subgraph other than the shortest connected subgraphs.

A system for use in embedding a problem in a target processor, the problem represented as a problem graph having a number of decision variables and the target processor represented as a hardware graph having a plurality of vertices coupleable via a number of edges may be summarized as including at least one nontransitory processor-readable medium; and at least one processor communicatively coupled to the At least one nontransitory processor-readable medium, and which in operation executes a first stage and a second stage which follows the first stage, in the first stage, the at least one processor: successively generate a number of sets of connected subgraphs, each set including a respective subgraph for each decision variable in the problem graph, where adjacent decisions variables in the problem graph are mapped to respective vertices in the hardware graph, the respective vertices which are connected by at least one respective edge in the hardware graph; and in a second stage, the at least one processor: refines the connected subgraphs created in the first stage such that no vertex represents more than a single decision variable. The at least one processor may use only unused vertices in the hardware graph to represent the decision variables if an unused vertex in the hardware graph is available to successively generate the number of sets of connected subgraphs.

The at least one processor may use used vertices in the hardware graph to represent the decision variables if no unused vertex in the hardware graph is available to successively generate the number of sets of connected subgraphs. The at least one processor may use a weighted shortest path determination to find a shortest path that uses only unused vertices of the hardware graph to successively generate the number of sets of connected subgraphs. The at least one processor, for each of at least some of the hardware vertices, may exponentially increase a weight associated with the respective hardware vertex as a function of a total number of decision variables represented by the respective hardware vertex to execute the weighted shortest path determination. The at least one processor, for each of at least some of the hardware vertices, may exponentially increase a weight associated with the respective hardware vertex as a function of a fixed value greater than one and a total number of decision variables represented by the respective hardware vertex to execute the weighted shortest path determination. The at least one processor, for each of at least some of the hardware vertices, may exponentially increase a weight associated with the respective hardware vertex as a function of a fixed value between 2 and 10 and a total number of decision variables represented by the respective hardware vertex to execute the weighted shortest path calculation.

The at least one processor, for each of at least some of the hardware vertices, may exponentially increase a weight associated with the respective hardware vertex in accordance with a function given by $$wt(g):=\alpha^{|\{i: g \in S_i\}|},$$

where $\alpha$ is greater than 1.

To refine the connected subgraphs, the at least one processor may iteratively, for each of the decision variables, in an defined order, remove the connected subgraph which represents the respective decision variable from the mapping of the problem graph to the hardware graph; and generate a replacement connected subgraph for the respective decision variable; and after completing the removal of the connected subgraph and the generation of the replacement connected subgraph for each of the decision variables, the at least one processor may determine whether the mapping of the problem graph to the hardware graph is improved relative to at least one previous mapping of the problem graph to the hardware graph. To determine whether the mapping of the problem graph to the hardware graph may be improved relative to at least one previous mapping of the problem graph to the hardware graph, the at least one processor may compare a largest number of decision variable represented at single vertex which single vertex has the largest number of variables represented of all of the vertices of the hardware graph for each of at least two different mappings of the problem graph to the hardware graph. To determine whether the mapping of the problem graph to the hardware graph may be improved relative to at least one previous mapping of the problem graph to the hardware graph, the at least one processor may compare a total sum of lengths of the connected subgraphs for each of at least two different mappings of the problem graph to the hardware graph. To determine whether the mapping of the problem graph to the hardware graph may be improved relative to at least one previous mapping of the problem graph to the hardware graph, the at least one processor may compare a length of a longest one of the connected subgraphs for each of at least two different mappings of the problem graph to the hardware graph. For each of the decision variables, the at least one processor may store information to the at least one nontransitory processor-readable medium that identifies the connected subgraphs that represent the respective decision variable; and may store information to the at least one nontransitory processor-readable medium that specifies the paths in the hardware graph that represent each edge in the problem graph. Based at least in part on stored information, the at least one processor may remove at least a portion of an adjacent connected subgraph which is adjacent to one of the connected subgraphs which is being removed.

The at least one processor may further determine whether there are any vertices in the hardware graph which represent more than on decision variable in the mapping; may determine whether a total number of iterations has exceeded a define number of iterations; and may terminate at an occurrence of the first of a determination that there are no vertices in the hardware graph which represent more than on decision variable in the mapping or the defined number of iterations has been reached. The problem graph may be a quadratic unconstrained binary optimization (QUBO) graph, the target processor may be at least one quantum processor that may include a plurality of qubits and a plurality of couplers, the couplers may be selectively operable to couple selected ones of the qubits to one another, and wherein the at least one processor may cause the QUBO graph to be embedded onto the quantum processor. The hardware graph may be a Chimera graph, and the at least one processor may be a digital processor which may successively generate the sets of connected subgraphs in tiles of the Chimera graph to successively generate the number of sets of connected subgraphs.

To successively generate a number of sets of connected subgraphs, the at least one processor may determine whether a respective vertex appears in more than one shortest connected subgraph; and if the respective vertex appears in more than one shortest connected subgraph, the at least one processor may add the vertex to a connected subgraph other than the shortest connected subgraphs.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION

Figure 1:
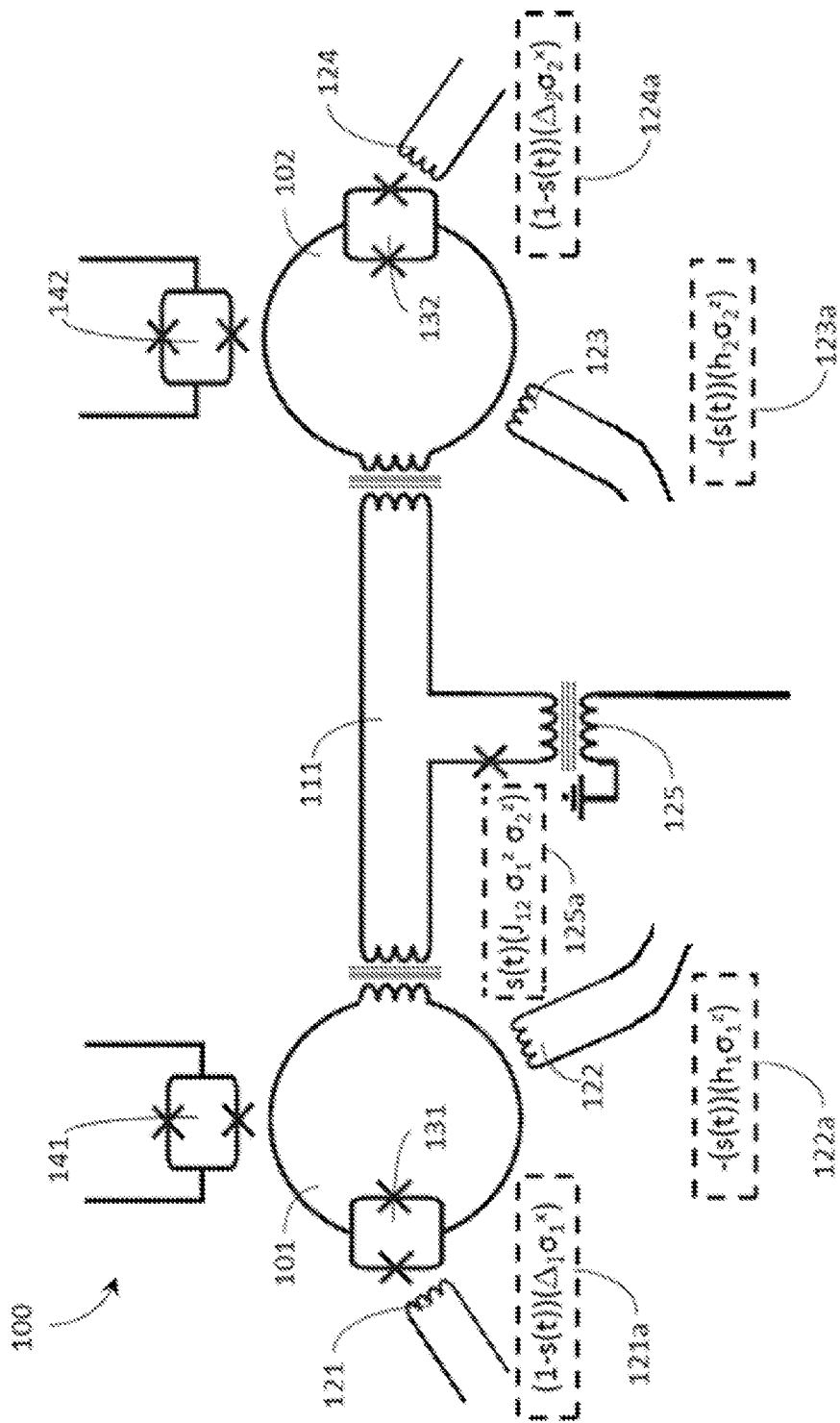
FIG. 1 is a schematic diagram of a portion of an exemplary superconducting quantum processor designed for AQC (and/or quantum annealing) that may be used to implement the present systems and methods.

In the following description, some specific details are included to provide a thorough understanding of various disclosed embodiments. One skilled in the relevant art, however, will recognize that embodiments may be practiced without one or more of these specific details, or with other methods, components, materials, etc. In other instances, well-known structures associated with quantum processors, such as quantum devices, coupling devices, and control systems including microprocessors, drive circuitry and non-transitory computer- or processor-readable media such as nonvolatile memory for instance read only memory (ROM), electronically eraseable programmable ROM (EEPROM) or FLASH memory, etc., or volatile memory for instance static or dynamic random access memory (ROM) have not been shown or described in detail to avoid unnecessarily obscuring descriptions of the embodiments of the present systems and methods. Throughout this specification and the appended claims, the words "element" and "elements" are used to encompass, but are not limited to, all such structures, systems and devices associated with quantum processors, as well as their related programmable parameters.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment," or "an embodiment," or "another embodiment" means that a particular referent feature, structure, or characteristic described in connection with the embodiment is included in at least one embodiment. Thus, the appearances of the phrases "in one embodiment," or "in an embodiment," or "another embodiment" in various places throughout this specification are not necessarily all referring to the same embodiment. Furthermore, the particular features, structures, or characteristics may be combined in any suitable manner in one or more embodiments.

It should be noted that, as used in this specification and the appended claims, the singular forms "a," "an," and "the" include plural referents unless the content clearly dictates otherwise. Thus, for example, reference to a problem-solving system including "a quantum processor" includes a single quantum processor, or two or more quantum processors, including a grid or distributed network of multiple quantum processors. It should also be noted that the term "or" is generally employed in its sense including "and/or" unless the content clearly dictates otherwise.

The headings provided herein are for convenience only and do not interpret the scope or meaning of the embodiments.

The various embodiments described herein provide systems and methods for solving computational problems via a quantum processor. As previously described, a quantum processor may comprise an architecture including a number of qubits and a number of coupling devices providing controllable communicative coupling between qubits (e.g., between respective pairs of qubits). The architecture of a quantum processor is typically fixed, in other words, the number of qubits in the architecture is fixed, and the connectivity between qubits (i.e., the number of available couplings each qubit has to other qubits) is also fixed. As a result of the architecture being fixed, there is a need in the art for techniques that facilitate solving problems of different structures via a quantum processor. For example, solving a problem that has more variables than the fixed number of qubits in the quantum processor may employ the problem decomposition techniques described in U.S. Pat. Nos. 7,870,087 and 8,032,474, both of which are incorporated herein by reference in their entirety, whereby a large problem that does not "fit" in the quantum processor is decomposed into sub-problems that do fit in the quantum processor. The present systems and methods provide, among other things, techniques for recombining (e.g., "stitching back together") the sub-solutions to such sub-problems in order to establish a solution to the original full-sized problem.

A further consequence of the quantum processor architecture being fixed is that the available connectivity may not provide couplings between all variables and, inevitably, some problem formulations may include variable couplings that are not available in the quantum processor architecture. The present systems and methods provide techniques for overcoming sparseness in the connectivity of the quantum processor architecture by reformulating problems in ways that are more amenable to being solved via the quantum processor.

Throughout this specification, the term "hardware" is generally used to refer to a quantum processor. Thus, the phrases "in hardware" and "by the hardware" and the like generally refer to "via the quantum processor" and similar, as the context reasonably dictates.

Throughout this specification, the terms hardware graph and specific architecture is generally used to refer to the specific fixed architecture of a quantum processor (i.e., the fixed number of qubits and connectivity between qubits in the quantum processor architecture). Throughout this specification, the term "Chimera" is generally used to refer to the specific fixed architecture of a quantum processor. Thus, a Chimera architecture may be represented in a graph where the fixed number of qubits correspond to nodes and the fixed connectivity between qubits corresponds to the edges between nodes. An example of a Chimera architecture is $C_2$. This is a 2 by 2 array of $K_{4,4}$ bipartite graph unit cells. In the $C_2$ there are 32 nodes and 80 edges. An example of a Chimera architecture is $C_8$. This is a 8 by 8 array of $K_{4,4}$ bipartite graph unit cells. In the Cg there are 512 nodes and 1472 edges. In some embodiments, not all nodes or edges in a hardware graph are available.

In accordance with some embodiments of the present systems and methods, a quantum processor may be designed to perform adiabatic quantum computation and/or quantum annealing. As previously discussed, a typical adiabatic evolution may be represented by Equation 1:

$$H_e = (1-s)H_{In} + sH_f \quad (1)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). A common approach to adiabatic quantum computation ("AQC"), described, for example, in Amin, M.H.S., "Effect of local minima on quantum adiabatic optimization", PRL 100, 130503 (2008), is to start with an initial Hamiltonian of the form shown in Equation 2:

$$H_{In} = -\frac{1}{2}\sum_{i=1}^{N}\Delta_i\sigma_i^x \quad (2)$$

where N represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{N}h_i\sigma_i^z + \sum_{i,j=1}^{N}J_{ij}\sigma_i^z\sigma_j^z\right] \quad (3)$$

where N represents the number of qubits, $\sigma_i^z$ is the Pauli z-matrix for the $i^{th}$ qubit, $h_i$ and $J_{i,j}$ are dimensionless local fields coupled into each qubit, and $\varepsilon$ is some characteristic energy scale for $H_f$. Here, the $\sigma_i^z$ and $\sigma_i^z\sigma_j^z$ terms are examples of "diagonal" terms. Throughout this specification, the terms "final Hamiltonian" and "problem Hamiltonian" are used interchangeably. Hamiltonians such as $H_{In}$ and $H_f$ in Equations 2 and 3, respectively, may be physically realized in a variety of different ways. A particular example is realized by an implementation of superconducting qubits.

FIG. 1 is a schematic diagram of a portion of an exemplary superconducting quantum processor 100 designed for AQC (and/or quantum annealing) that may be used to implement the present systems and methods. The portion of superconducting quantum processor 100 shown in FIG. 1 includes two superconducting qubits 101, 102 and a tunable ZZ-coupler 111 coupling information therebetween (i.e., providing pair-wise coupling between qubits 101 and 102). While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC and/or QA by initializing the system with the Hamiltonian described by equation 2 and evolving the system to the Hamiltonian described by equation 3 in accordance with the evolution described by equation 1. Quantum processor 100 includes a plurality of interfaces 121-125 that are used to configure and control the state of quantum processor 100. Each of interfaces 121-125 may be realized by a respective inductive coupling structure, as illustrated, as part of a programming subsystem and/or an evolution subsystem. Such a programming subsystem and/or evolution subsystem may be separate from quantum processor 100, or it may be included locally (i.e., on-chip with quantum processor 100) as described in, for example, U.S. Pat. Nos. 7,876,248 and 8,035,540.

In the operation of quantum processor 100, interfaces 121 and 124 may each be used to couple a flux signal into a respective compound Josephson junction 131,132 of qubits 101 and 102, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of equation 3. Furthermore, interface 125 may be used to couple a flux signal into coupler 111, thereby realizing the $J_{ij}$ term(s) in the system Hamiltonian. This coupling provides the diagonal $\sigma_i^z\sigma_j^z$ terms of equation 3. In FIG. 1, the contribution of each of interfaces 121-125 to the system Hamiltonian is indicated in boxes 121a-125a, respectively. Thus, throughout this specification and the appended claims, the terms "problem formulation" and "configuration of a number of programmable parameters" are used to refer to, for example, a specific assignment of $h_i$ and $J_{ij}$ terms in the system Hamiltonian of a superconducting quantum processor via, for example, interfaces 121-125.

Throughout this specification and the appended claims, the term "quantum processor" is used to generally describe a collection of physical qubits (e.g., qubits 101 and 102) and couplers (e.g., coupler 111). The physical qubits 101 and 102 and the couplers 111 are referred to as the "programmable elements" of the quantum processor 100 and their corresponding parameters (e.g., the qubit $h_i$ values and the coupler $J_{ij}$ values) are referred to as the "programmable parameters" of the quantum processor. In the context of a quantum processor, the term "programming subsystem" is used to generally describe the interfaces (e.g., "programming interfaces" 122, 123, and 125) used to apply the programmable parameters (e.g., the $h_i$ and $J_{ij}$ terms) to the programmable elements of the quantum processor 100 and other associated control circuitry and/or instructions. As previously described, the programming interfaces of the programming subsystem may communicate with other subsystems which may be separate from the quantum processor or may be included locally on the processor. As described in more detail later, the programming subsystem may be configured to receive programming instructions in a machine language of the quantum processor and execute the programming instructions to program the programmable elements in accordance with the programming instructions. Similarly, in the context of a quantum processor, the term "evolution subsystem" is used to generally describe the interfaces (e.g., "evolution interfaces" 121 and 124) used to evolve the programmable elements of the quantum processor 100 and other associated control circuitry and/or instructions. For example, the evolution subsystem may include annealing signal lines and their corresponding interfaces (121, 124) to the qubits (101, 102).

Quantum processor 100 also includes readout devices 141 and 142, where readout device 141 is configured to read out the state of qubit 101 and readout device 142 is configured to read out the state of qubit 102. In the embodiment shown in FIG. 1, each of readout devices 141 and 142 comprises a respective DC-SQUID that is configured to inductively couple to the corresponding qubit (qubits 101 and 102, respectively). In the context of quantum processor 100, the term "readout subsystem" is used to generally describe the readout devices 141, 142 used to read out the final states of the qubits (e.g., qubits 101 and 102) in the quantum processor to produce a bit string. The readout subsystem may also include other elements, such as routing circuitry (e.g., latching elements, a shift register, or a multiplexer circuit) and/or may be arranged in alternative configurations (e.g., an XY-addressable array, an XYZ-addressable array, etc.). Qubit readout may also be performed using alternative circuits, such as that described in PCT Patent Publication 2012-064974.

While FIG. 1 illustrates only two physical qubits 101, 102, one coupler 111, and two readout devices 141, 142, a quantum processor (e.g., processor 100) may employ any number of qubits, couplers, and/or readout devices, including a larger number (e.g., hundreds, thousands or more) of qubits, couplers and/or readout devices. The application of the teachings herein to processors with a different (e.g., larger) number of computational components should be readily apparent to those of ordinary skill in the art.

Figure 2:
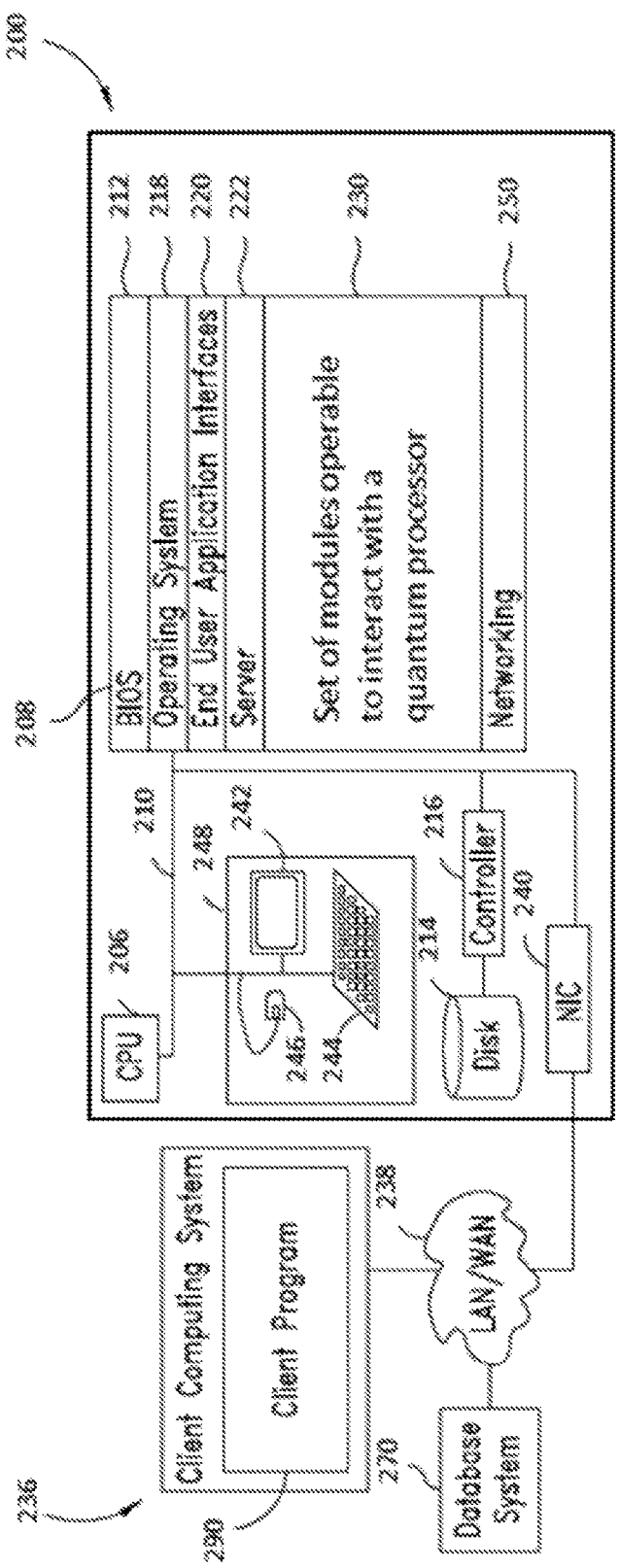
FIG. 2 illustrates an exemplary digital computer including a digital processor that may be used to perform classical digital processing tasks described in the present systems and methods.

FIG. 2 illustrates an exemplary digital computer 200 including a digital processor 206 that may be used to perform classical digital processing tasks described in the present systems and methods. Those skilled in the relevant art will appreciate that the present systems and methods can be practiced with other digital computer configurations, including hand-held devices, multiprocessor systems, microprocessor-based or programmable consumer electronics, personal computers ("PCs"), network PCs, mini-computers, mainframe computers, and the like. The present systems and methods can also be practiced in distributed computing environments, where tasks or modules are performed by remote processing devices, which are linked through a communications network. In a distributed computing environment, program modules may be located in both local and remote memory storage devices.

Digital computer 200 may include at least one processing unit 206 (i.e., digital processor), at least one system memory 208, and at least one system bus 210 that couples various system components, including system memory 208 to digital processor 206. Digital computer 200 will at times be referred to in the singular herein, but this is not intended to limit the application to a single digital computer 200. For example, there may be more than one digital computer 200 or other classical computing device involved throughout the present systems and methods.

Digital processor 206 may be any logic processing unit, such as one or more central processing units ("CPUs"), digital signal processors ("DSPs"), application-specific integrated circuits ("ASICs"), etc. Unless described otherwise, the construction and operation of the various blocks shown in FIG. 2 are of conventional design. As a result, such blocks need not be described in further detail herein, as they will be understood by those skilled in the relevant art.

System bus 210 can employ any known bus structures or architectures, including a memory bus with a memory controller, a peripheral bus, and a local bus. System memory 208 may include non-volatile memory such as read-only memory ("ROM") and volatile memory such as random access memory ("RAM") (not shown). A basic input/output system ("BIOS") 212, which can form part of the ROM, contains basic routines that help transfer information between elements within digital computer 200, such as during startup.

Digital computer 200 may also include other non-volatile memory 214. Non-volatile memory 214 may take a variety of forms, including: a hard disk drive for reading from and writing to a hard disk, an optical disk drive for reading from and writing to removable optical disks, and/or a magnetic disk drive for reading from and writing to magnetic disks. The optical disk can be a CD-ROM or DVD, while the magnetic disk can be a magnetic floppy disk or diskette. Non-volatile memory 214 may communicate with digital processor 206 via system bus 210 and may include appropriate interfaces or controllers 216 coupled between non-volatile memory 214 and system bus 210. Non-volatile memory 214 may serve as long-term storage for computer-readable instructions, data structures, program modules and other data for digital computer 200. Although digital computer 200 has been described as employing hard disks, optical disks and/or magnetic disks, those skilled in the relevant art will appreciate that other types of non-volatile computer-readable media may be employed, such a magnetic cassettes, flash memory cards, Bernoulli cartridges, Flash, ROMs, smart cards, etc.

Various program modules, application programs and/or data can be stored in system memory 208. For example, system memory 208 may store an operating system 218, end user application interfaces 220 and server applications 222. In accordance with the present systems and methods, system memory 208 may store at set of modules 230 operable to interact with a quantum processor (not shown in FIG. 2). In some embodiments, system memory 208 stores an embedding module 232. The embedding module 232 implements some of the method shown in FIG. 10. In some embodiments, system memory 208 stores a graph techniques module 236. The graph techniques module 236 provides standard graph processing techniques like traversing a graph, determining the presence of a cycle, calculating the length of a weighted path, and the like.

System memory 208 may also include one or more networking applications 250, for example, a Web server application and/or Web client or browser application for permitting digital computer 200 to exchange data with sources via the Internet, corporate Intranets, or other networks, as well as with other server applications executing on server computers. Networking application 250 in the depicted embodiment may be markup language based, such as hypertext markup language ("HTML"), extensible hypertext markup language ("XHTML"), extensible markup language ("XML") or wireless markup language ("WML"), and may operate with markup languages that use syntactically delimited characters added to the data of a document to represent the structure of the document. A number of Web server applications and Web client or browser applications are commercially available, such as those available from Mozilla and Microsoft.

While shown in FIG. 2 as being stored in system memory 208, operating system 218 and various applications/modules 220, 222, 230, 250 and other data can also be stored in nonvolatile memory 214.

Digital computer 200 can operate in a networking environment using logical connections to at least one client computer system 236 and at least one database system 270. These logical connections may be formed using any means of digital communication, for example, through a network 238, such as a local area network ("LAN") or a wide area network ("WAN") including, for example, the Internet. The networking environment may include wired or wireless enterprise-wide computer networks, intranets, extranets, and/or the Internet. Other embodiments may include other types of communication networks such as telecommunications networks, cellular networks, paging networks, and other mobile networks. The information sent or received via the logical connections may or may not be encrypted. When used in a LAN networking environment, digital computer 200 may be connected to the LAN through an adapter or network interface card ("NIC") 240 (communicatively linked to system bus 210). When used in a WAN networking environment, digital computer 200 may include an interface and modem (not shown), or a device such as NIC 240, for establishing communications over the WAN. Non-networked communications may additionally, or alternatively be employed.

In a networked environment, program modules, application programs, data, or portions thereof can be stored outside of digital computer 200. Those skilled in the relevant art will recognize that the logical connections shown in FIG. 2 are only some examples of establishing communications between computers, and other connections may also be used.

While digital computer 200 may generally operate automatically, an end user application interface 220 may also be provided such that an operator can interact with digital computer 200 through different user interfaces 248, including output devices, such as a monitor 242, and input devices, such as a keyboard 244 and a pointing device (e.g., mouse 246). Monitor 242 may be coupled to system bus 210 via a video interface, such as a video adapter (not shown). Digital computer 200 can also include other output devices, such as speakers, printers, etc. Other input devices can also be used, including a microphone, joystick, scanner, etc. These input devices may be coupled to digital processor 206 via a serial port interface that couples to system bus 210, a parallel port, a game port, a wireless interface, a universal serial bus ("USB") interface, or via other interfaces.

NIC 240 may include appropriate hardware and/or software for interfacing with the elements of a quantum processor (not shown). In other embodiments, different hardware may be used to facilitate communications between digital computer 200 and a quantum processor. For example, digital computer 200 may communicate with a quantum processor via a direct electrical connection (e.g., via Universal Serial Bus, Firewire, or the like), a wireless connection (e.g., via a Wi-Fi® network), or an Internet connection.

Client computer system 236 may comprise any of a variety of computing devices communicatively coupled to digital computer 200, and may include a client program 290 configured to properly format and send problems directly or indirectly to server application 222. Once digital computer 200 has determined a solution, server application 222 may be configured to send information indicative of this solution back to client program 290.

In the various embodiments described herein, a digital computer (e.g., classical or digital computer 200) may be used to interact with a quantum processor. A quantum processor may include a number of programmable elements, and interacting with a quantum processor may include programming the quantum processor with a particular problem formulation and/or configuration of programmable parameters by assigning specific values to these programmable elements. Interacting with a quantum processor may also include evolving the quantum processor (e.g., performing adiabatic quantum computation and/or quantum annealing) to determine a solution to the particular problem and reading out the solution from the quantum processor.

Figure 3:
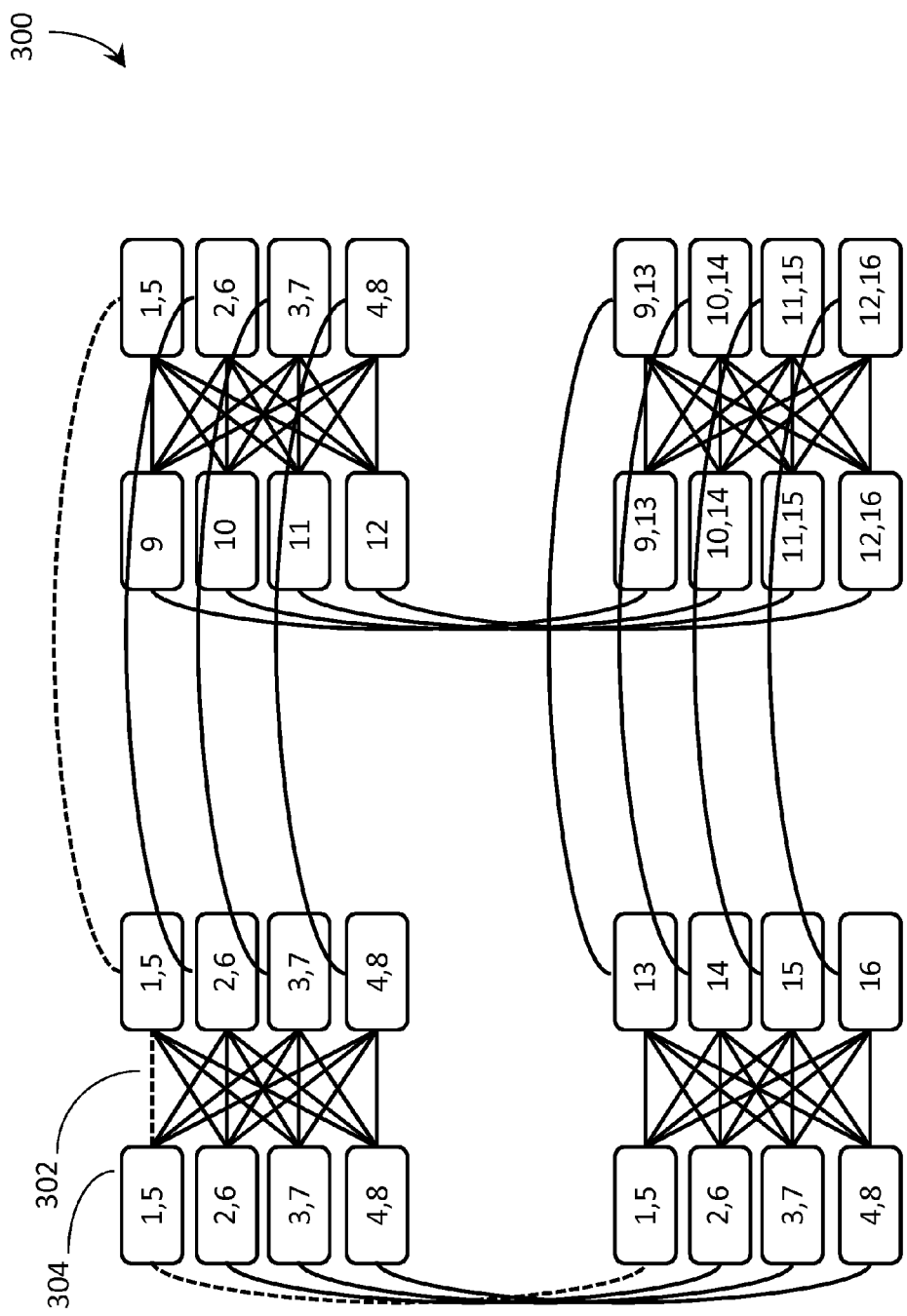
FIG. 3 illustrates an exemplary hardware graph decomposition given a complete graph as a primal graph, according to at least one implemenation of the present systems and methods.

FIG. 3 illustrates an exemplary hardware graph decomposition given a complete graph as a primal graph. Many problems present a QUBO that does not fit into the hardware graph because it has too many variables, or too many interactions between variables. In accordance with the present systems and methods, solving such problems via the quantum processor may be facilitated by casting individual qubits to represent multiple variables. In other words, multiple variables may be mapped to the same qubit such that the state of that qubit represents specific configurations of the multiple variables.

Assume the original problem is represented by the primal graph G=(V, E) where V is a set of vertices and E a set of edges. The primal graph, also known as the problem graph, is found in the adjacency information in the QUBO. The vertices of this graph represent the binary variables of the QUBO, and two variables are adjacent if there is a nonzero quadratic interaction term between them. Let the hardware graph be denoted $G_H=(V_H, E_H)$. Then a (specific) hardware decomposition of G is defined by a collection of subgraphs of $G_H$, one for each vertex of V. These subgraphs are called chains, denoted $S_i$, $i \in V$. Each variable is represented by a chain in the hardware graph such that if two variables are adjacent in the primal graph there is an edge between the chains in the hardware graph. Each chain can be thought of as having a unique qubit root. An edge in the primal graph is presented as a path in the hardware graph. In some embodiments, a chain is a linear structure; in some embodiments a chain is a tree; in some embodiments the chain is a cycle; and in some embodiments the chain includes a tree and a cycle. In some embodiments, every chain $S_i$ is a nonempty connected subgraph. In some embodiments, if indices i and j are adjacent in G, then $S_i$ and $S_j$ either share a common vertex, or have at least one edge between them in $G_H$. A chain is a plurality of qubits representing one variable.

An example of a Chimera decomposition of the complete graph on 16 vertices is given in FIG. 3 (using $C_2$ as the hardware graph $G_H$). If all of the chains Si are disjoint, then a hardware decomposition of $G_H$ is simply a minor-embedding of G into $G_H$. However, while many primal graphs are too large to be minor-embedded into G, a hardware decomposition of G can always be found.

The usefulness of a hardware decomposition depends on how many variables (vertices of V) are represented by a single physical qubit (vertex of $V_H$). A bag is a plurality of variables represented at one qubit. In some embodiment, a bag is defined as set $B_q$, $q \in V_H$, to be the set of vertices of G represented at qubit q:

$$B_q = \{i \in V : q \in S_i\}. \tag{4}$$

The bag-width or hardware-width of a hardware decomposition is the size of the largest bag. That is, the bag-width is the number of variables represented at each qubit. A decomposition with bag-width 1 is a minor-embedding. The decomposition in FIG. 3 has a bag-width of 2. There are at most two variables associated with a qubit. Multiple qubits have 2 variables associated with the respective qubits. In the graph 300 in a Chimera decomposition of the complete graph $K_{16}$ is embedded in the hardware specific graph, $C_2$. The chain $S_1$ (302) is drawn with stippled lines. An example bag 304 of width 2, and including variables 1, and 5 is included in the chain.

Figure 9:
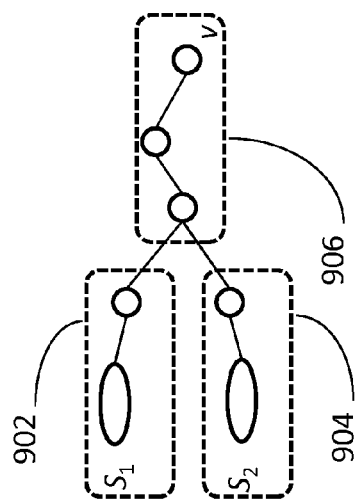
FIG. 9 illustrates an exemplary method of adding a chain to a decomposition, according to at least one implementation of the present systems and methods.
Figure 10:
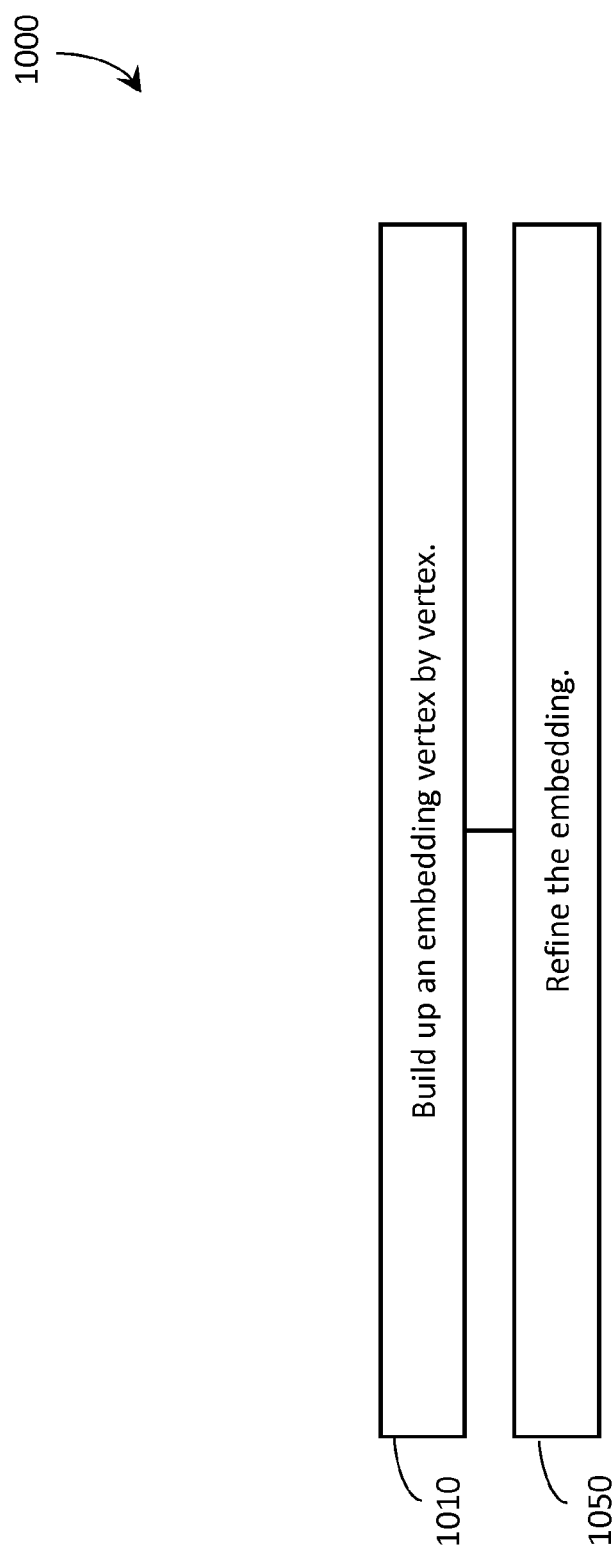
FIG. 10 is a flow-diagram showing two stages of a method to find a embedding for a primal graph in a hardware graph, according to at least one implementation of the present systems and methods.
Figure 11:
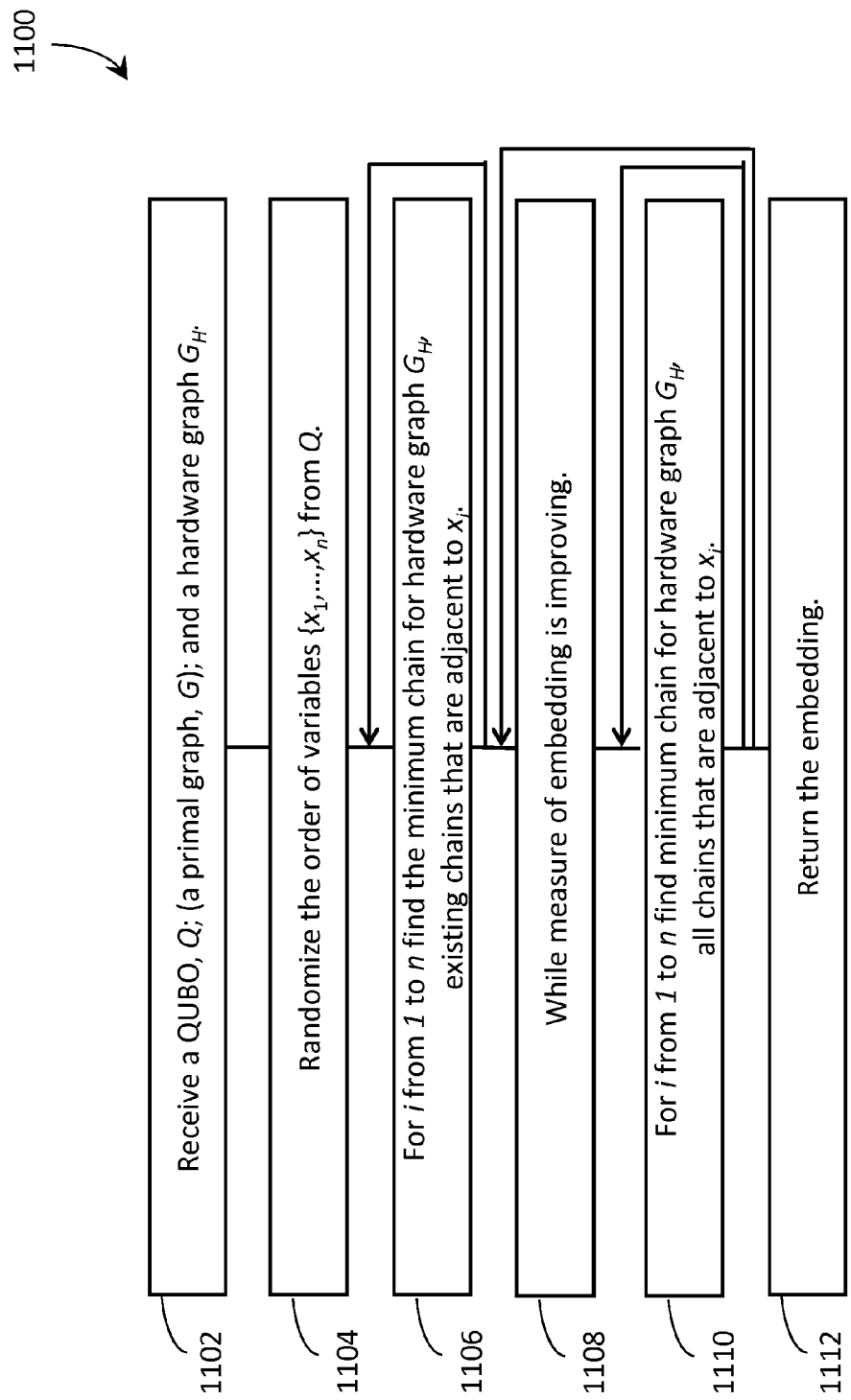
FIG. 11 is a flow-diagram showing an example of the method illustrated in FIG. 10.
Figure 12:
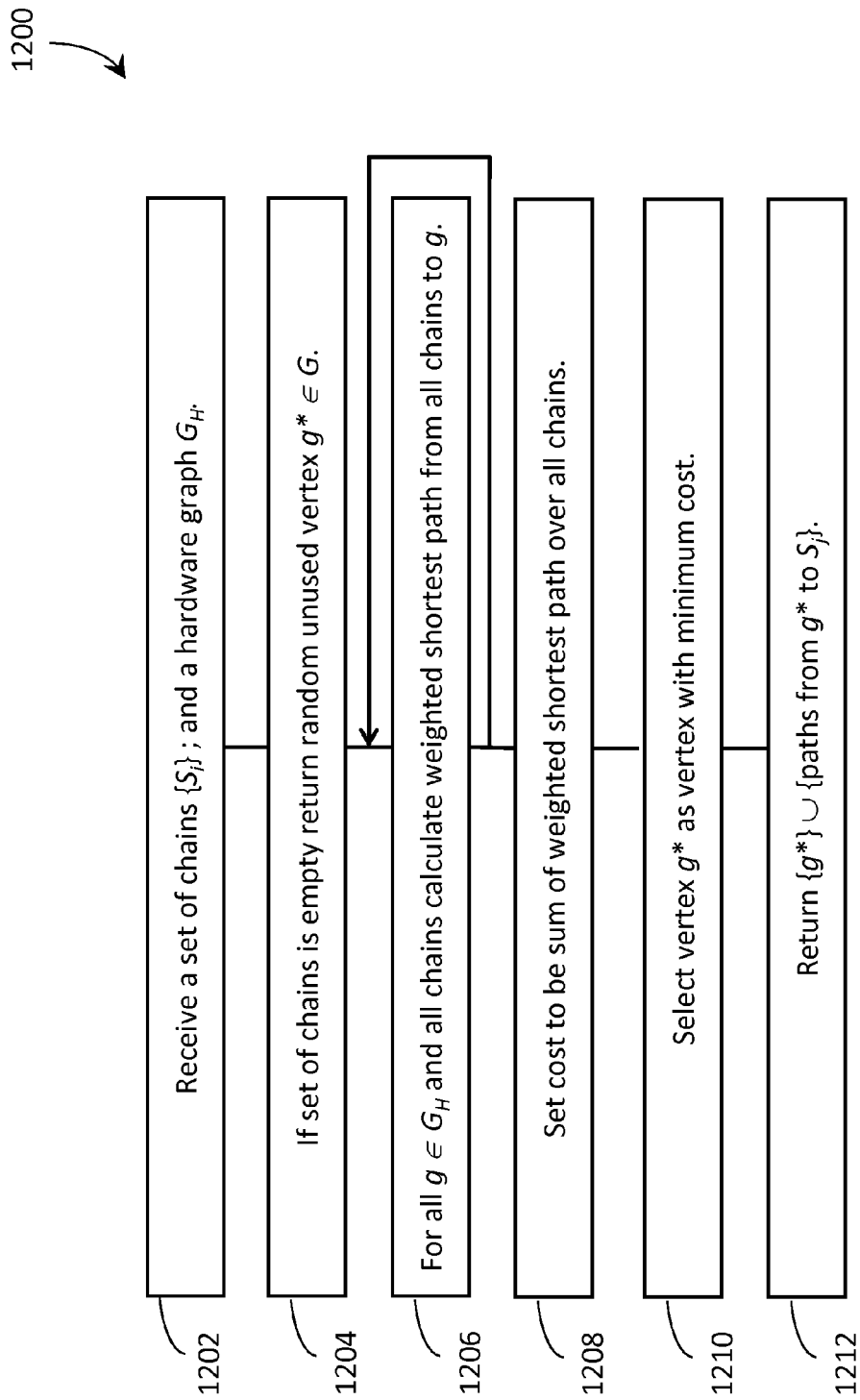
FIG. 12 is a flow-diagram showing a portion of the method illustrated in FIG. 10.

The description will return to how hardware decompositions may be used to solve QUBOs at FIGS. 10-12. Shown in FIGS. 4-9 are methods and examples of how hardware decompositions can be found. These decompositions are used in FIG. 10 to perform an embedding. Examples of the techniques to form an embeddings are shown in FIGS. 11 and 12.

Determining whether or not one graph has a minor-embedding in another is an NP-complete problem; this shows that finding a decomposition of minimal bag-width is hard in general. Since given hardware graph, such as a Chimera graph, is fixed, the graph-minors theorem implies that there is a technique for determining if G is a minor of $G_H$ which has running time polynomial in $|V|$. However, there is no known construction for that algorithm, and all of the known exact algorithms for determining minors are much too slow to be of any practical use. Instead, a heuristic method is used to build hardware decompositions. In general, the bag-width of these decompositions is not minimal but also not impractically large, and the method is fast enough to be applied to problems on the current scale of interest.

Figure 4:
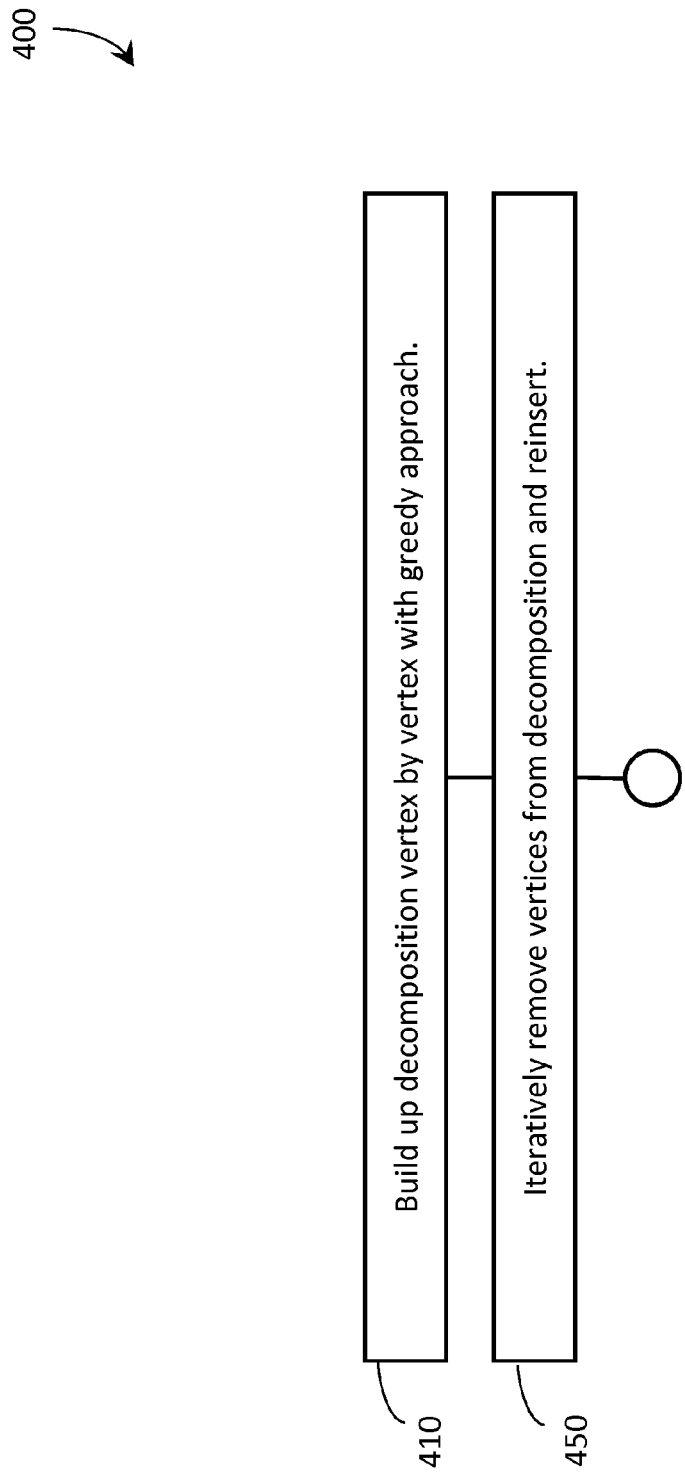
FIG. 4 is a flow-diagram showing two stages of a method to find a hardware graph decomposition for a primal graph, according to at least one implemenation of the present systems and methods.

FIG. 4 is a flow-diagram showing two stages of a method 400 to find a hardware graph decomposition for a primal graph. The method 400 works in two stages: 410 and 450. In the first stage 410, a decomposition finder greedily builds up a hardware decomposition of G, vertex by vertex. As each vertex is added the finder has a partial decomposition of G. A partial decomposition of G is a specific hardware decomposition of the subgraphs of the primal graph G induced by vertices added so far. The method 400 is greedy in that the addition of a vertex from the hardware graph $G_H$ avoids increasing a measure in the decomposition, such as, a measure in bag size or chain length. The avoidance only considers the instant addition and past additions and not future additions. In the second stage 450, the method rectifies the greedy deficiencies of the first stage 410. The decomposition finder tries to improve the current decomposition using a local search. The decomposition finder iteratively removes a vertex of G from the decomposition and then reinserts it, hopefully in a better place. The method 400 is summarized below:

---
findChimeraDecomposition(G)

Stage 1:
    order V(G) as $(v_1, \ldots, v_n)$
    D = decomposition of empty graph
    for i from 1 to n do
        add $v_i$ to decomposition D of $G[v_1, \ldots, v_{i-1}]$
Stage 2:
    while bag-width(D) is improved
        for i from 1 to n do
            remove $v_i$ from D
            add $v_i$ to decomposition D of $G[V\backslash v_i]$
--- where $V\backslash v_i$ denotes $v_i$ not in V.

Figure 5:
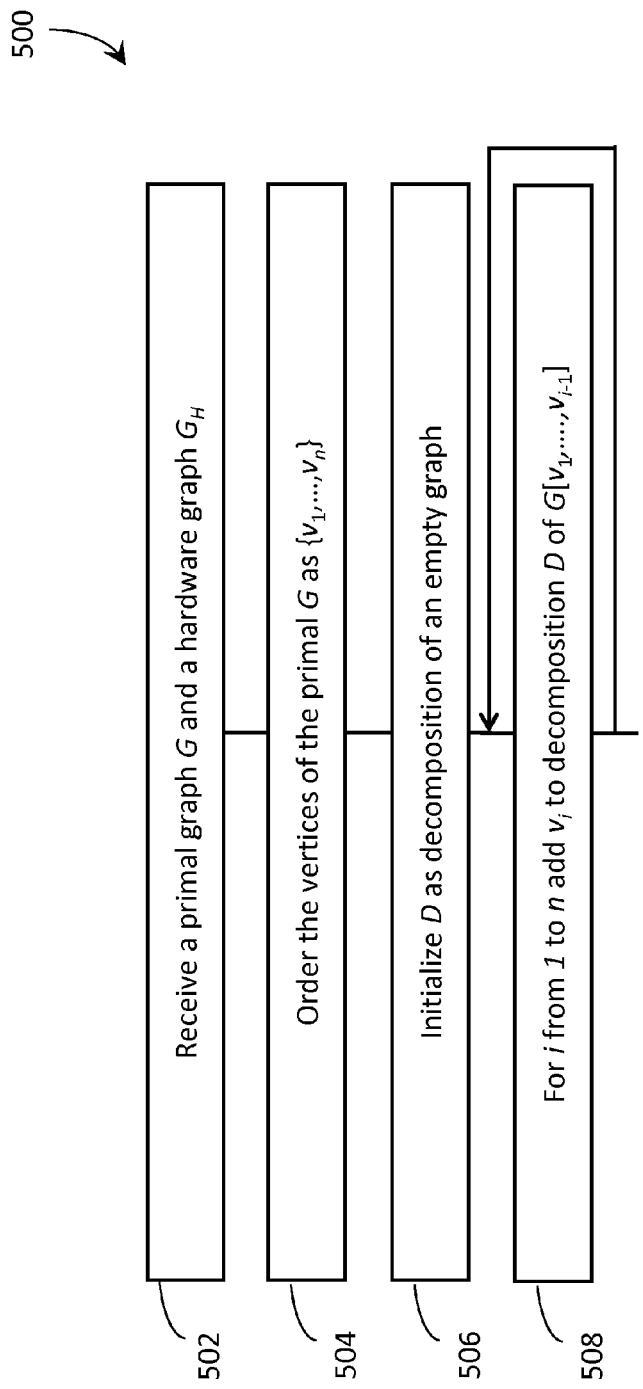
FIG. 5 is a flow-diagram showing the first stage of the method illustrated in FIG. 4.

FIG. 5 is a flow-diagram showing a method 500 as an example of the first stage FIG. 4. At 502 the decomposition finder receives a primal graph G. The primal graph may be called a problem graph as it encodes a problem. Also at 502 the hardware graph $G_H$ is received. At 504 the decomposition finder orders the vertices of the primal graph into a set. At 506 the decomposition finder creates an empty decomposition, D. A non-empty decomposition D includes a list of chains. At 508 a for loop over an index corresponding to the number of vertices in the primal graph starts. Each vertex is added to the decomposition D of the induced sub-graph $G[v_1, \ldots, v_{i-1}]$. As a decomposition is a list of chains the addition includes determining which chain to add the vertex to and including forming a new chain. This is done in a greedy fashion using one or more heuristics as described below. As the for loop progresses the induced sub-graph approaches the primal graph G. Method 500 returns a decomposition D of primal graph G, e.g., decomposition 300 from FIG. 3.

Figure 6:
FIG. 6 is a flow-diagram showing the second stage of the method illustrated in FIG. 4.

FIG. 6 is a flow-diagram showing a method 600 as an example of the second stage FIG. 4. At 602 a decomposition finders receives a primal graph G, a hardware graph $G_H$, and a decomposition D. At 602 a "while loop" based on a measure begins. In some embodiments, the "while loop" terminates if the measure does not improve after the last iteration. In some embodiments, the "while loop" terminates if the measure has not improved after a set number of iterations. In some embodiments the measure is allowed to worsen before the "while loop" terminates. In some embodiments, the measure is maximum bag-width of the decomposition. In some embodiments, the measure is the sum of the bag-widths of the decomposition. In some embodiments, the measure the chain length within the decomposition.

At 604 the decomposition finder starts a "for loop" over an index corresponding to the number of vertices in the primal graph. In the body of the "for loop", at 606, a vertex corresponding to the current index is removed from the decomposition, D. At 608 the removed vertex is re-added to the decomposition, D, of the primal graph without the removed vertex, $G[V\backslash v_i]$. Unlike in method 500, the adding of the vertex to a decomposition is to the primal graph without the removed vertex, $G[V\backslash v_i]$, and not the induced subgraph $G[v_1, \ldots, v_{i-1}]$. The re-addition of the vertex hopefully improves the measure governing the "while loop" 502.

Both stages 410 and 450 of method 400 of the method use a heuristic that, given a partial decomposition of G, extends it to include one more vertex. See, for example, 508 in method 500 and 608 in method 600. This heuristic is described.

A decomposition of an induced subgraph $G[v_1, \ldots, v_{i-1}]$ is a list of chains $S_1, \ldots, S_{i-1}$ in $G_H$ such that every edge $v_j v_k$ of $G[v_1, \ldots, v_{i-1}]$ is represented. This representation is either as a vertex in $S_j \cap S_k$ or as an edge between $S_j$ and $S_k$. For the decomposition finder to add a new chain $S_i$ in such a way that every edge between $v_i$ and $\{v_1, \ldots, v_{i-1}\}$ is represented, yet the bag sizes of the partial decomposition do not increase too much. More precisely, the decomposition finder seeks a connected subgraph $S_i$ in G of minimal size such that $S_i$ contains a vertex in or adjacent to a vertex in $S_j$, for every neighboring pair, $v_j \sim v_i$.

This problem of finding a minimal subgraph which connects a fixed set of vertices in a graph is known as the Steiner Tree problem and is itself NP-complete. However, the problem can be efficiently approximated to within a constant factor of the optimal solution. Here the decomposition finder approximates Steiner trees using a union of shortest paths.

As would be understood to a person of skill in the art, a Steiner tree is related to the minimum Steiner tree problem, is a problem in combinatorial optimization, to find the shortest interconnect for a given set of objects. Given an edge-weighted graph G=(V, E, w) and a subset $S \subseteq V$ of required vertices. A Steiner tree is a tree in G that spans all vertices of S. (A minimum spanning tree is one that spans V). There are two versions of the problem: in the optimization problem to find a minimum-weight Steiner tree, and the in the decision problem, given a value k the task is to determine whether a Steiner tree of total weight at most k exists.

The decomposition finder's heuristic for adding $v_i$ is the following. Let $v_j$ be a neighbor of $v_i$, and let $S_j$ be the subgraph for $v_j$ in the partial decomposition. First, find the shortest path from $S_j$ to every other vertex v in $G_H$. This can be done efficiently using Djikstra's algorithm. Let c(v,j) denote the length of that shortest path from $S_j$ to v. Repeat this for every neighbor $v_j$, and sum the lengths c(v,j) over all j to obtain a cost of each vertex v. Choose v of minimal cost, along with its paths to each $S_j$, to be the subgraph $S_i$ representing $v_i$. This procedure is illustrated in FIG. 7.

Figure 7:
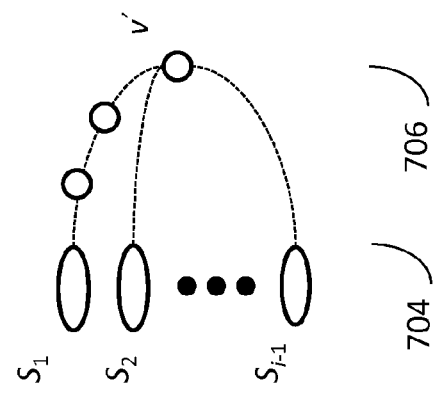
FIG. 7 illustrates an exemplary method of selecting a root of a new chain, according to at least one implementation of the present systems and methods.
Figure 7:
Figure 7:
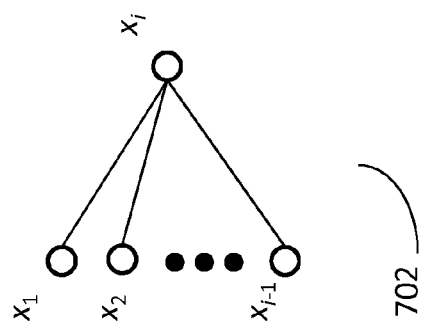

FIG. 7 illustrates an exemplary method 700 of selecting a root of a new chain. A primal graph 702 is shown. The vertices are labeled x to denote these are variables. The adjacencies of the variables are shown. The decomposition finder is desirous of finding a new root of a chain for variable $x_i$ within the qubits in the hardware graph. In the example of FIG. 7, a set of chains $S_1$ through $S_{i-1}$ is known and shown at 704. Adjacent to the chains are a plurality of unused vertices 706 with generic vertex v. Let c(v,j) denote the length of weighted path from $S_j$ to the generic vertex v in the hardware graph. Let c(v) be the sum of the lengths over all the chains, as indexed by j. First, compute the shortest-path distance from S to every unused vertex v in the subgraph of the hardware graph $G_H$ that has yet to be added to a chain. Record this information as c(v,j). Then compute c(v). Next choose the vertex v that has the smallest total sum of distances c(v). If there is no vertex v that has a path to every chain using only unused vertices, then the heuristic fails. Once the vertex v is selected the paths from the chains to the vertex are unioned. This union operation can result in a cycle.

In practice, there are refinements which improve the performance of this method. These are enumerated below. As the decomposition finder is concerned about the size of the largest bag in the decomposition, while embodiments of the method as stated attempts to minimize the sum of the sizes of the bags. For this reason, in some embodiments the shortest paths calculation is replaced with a with a weighted shorted paths calculation. Each vertex in $G_H$ is given a weight such that the selection of a vertex that increases a bag size greatly increases the calculated length. In some embodiments, the weight is proportional to an exponentiation of a function in the bag size. For example, $$wt(v) \propto b^{f(|B_v|)} \quad (5)$$

where b is the base of the exponent and is, for example, the number of qubits in the hardware graph; and f is a function in the bag size. In practice this allows the shortest paths to avoid large bags for as long as possible.

Another refinement includes removing cycles. Note that by choosing Si to be a union of paths, $S_i$ may in fact contain cycles: clearly this is a suboptimal approximation to a Steiner tree. When the union of two paths contains a cycle, remove the part of the cycle coming from one of the paths. This can be done efficiently without affecting the connectivity of $S_i$.

Figure 8:
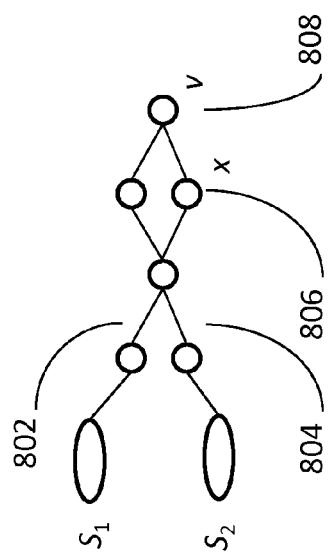
FIG. 8 illustrates an exemplary method of removing a portion of a cycle formed by the union of two chains, according to at least one implementation of the present systems and methods.

FIG. 8 illustrates an exemplary input to a method 800 for removing a portion of a cycle formed by the union of two paths. The addition of a vertex can result in a cycle. If a cycle is detected this can be removed. For example if there is a path 802 from chain 1 to vertex 808 and there is a path 804 from chain 2 to vertex 808. If the union of the paths includes a cycle, the cycle can be removed. For example, removing vertex 806 from path 804.

Another refinement includes dealing with a choice of which chain to add a vertex too. Note that after selecting a vertex v with shortest paths to represent $S_i$, the vertices on the path from v to a neighbor $S_j$ could in fact be added to the subgraph $S_j$—rather than $S_i$. The decomposition finder chooses which chain to add vertices to by the following heuristic. If a vertex u appears in more than one shortest path, say the paths to $S_j$ and $S_k$, then u is added to $S_i$. (This is preferable to adding u to both $S_j$ and $S_k$, as it only increases the bag size of u by 1 rather than 2.) On the other hand, a vertex u that appears in only a single shortest path, say the path to $S_j$, then u is added to $S_j$. (The motivation for this choice is that u may lead to shorter paths to the neighbors of vj other than vi.) FIG. 9 illustrates an exemplary method 900 of adding a chain 906 to a decomposition including chains 902 and 904.

In some embodiments, the method 400 terminates when second stage 450 stops improving (i.e. deleting and reintroducing a vertex in the decomposition no longer leads to smaller bag sizes). In fact, the method 400 performs better using a "tabu" heuristic described here and above. The second stage 450 is allowed to get worse before it gets better. The method 400 terminates if no improvement is seen after a fixed number of iterations.

Several aspects of the method 400 may be randomized. For example, the initial order of the vertices of G in the first stage 410. As well the choice of paths in the decomposition when paths have equal weight can be decided at random. The choice of exponent in weighting shortest paths can be selected at random. The method 400 is most effective when it is run repeatedly over different random choices of these parameters.

FIG. 10 is a flow-diagram showing two stages of a method 1000 to find a embedding for a primal graph in a hardware graph. Embodiments of method 1000 resemble in some respects method 400 and its variations and examples above. In method 1000 the objective is to find an embedding. That is a decomposition of bag width 1. The method 1000 works in two stages: 1010 and 1050. In the first stage 1010, an embedding finder greedily builds up a decomposition of primal graph G, vertex by vertex. As each vertex is added the finder has a partial embedding of G. A partial embedding of G is a specific hardware embedding of the subgraphs of the primal graph G induced by vertices added so far. The method 1000 is greedy in that the addition of a vertex from the hardware graph $G_H$ for increasing a measure in the embedding such as in the bag size or chain length. Examples of the measure are described herein below. That is the first stage 1010 successively generates a set of connected subgraphs. There is a respective subgraph for each respective variable in the primal graph. Variables that are adjacent in the primal graph are connected by at least one respective edge in the hardware graph. In the second stage 1050, the method rectifies the greedy deficiencies of the first stage 1010. The embeddings finder tries to improve the current embedding. The embedding finder iteratively removes a vertex of G from the embedding and then reinserts it, hopefully in a better place. That is the connected subgraphs created in the first stage 1010 are refined such that no vertex in the hardware graph represents more than one variable from the primal graph.

Some embodiments find an embedding, if it exists, with some reasonable probability. Also, the search for an embedding is not typically for a unique solution, if a graph can be embedded, the graph can probably be embedded in many ways. One way to see this is the following: in an embedding, each variable $x_i$ is represented by a connected subgraph $S_i$ of the hardware graph so that if $x_i$ and $x_j$ are adjacent in the QUBO graph then there is an edge between $S_i$ and $S_j$ in the hardware graph. Think of a chain $S_i$ as having a unique root vertex $g_i$. Then the edge $x_i x_j$ is represented by a path from $g_i$ to $g_j$, where the first k vertices (for some k) are in $S_i$ and the rest are in $S_j$. Modifying the choice of path from $g_i$ to $g_j$, or even modifying the choice of k, gives a new embedding.

The fact that there are often a large number of embeddings is particularly true of the Chimera hardware graph. The ideal Chimera graph $C_N$ on $8N^2$ vertices has an automorphism group of size $8(4!)^{2N}$, and applying an automorphism to an embedding typically results in a different embedding. So, probabilistic methods are a feasible approach to the embedding problem.

Thus, under the method 1000 multiple variables are temporarily allowed to be represented by the same vertex in a hardware graph. Further, chains are repeatedly updated by removing them and using the shortest-paths procedure to find better ones. Typically, the processor(s) builds up the set of chains, trying to find shortest paths using only unused vertices. However, if no such path exists, then paths using other vertices are allowed. In some embodiments, the finders implement this using a weighted shorted paths calculation, in which the weight of a hardware vertex grows exponentially with the number of variables represented there:

$$wt(g) := \alpha^{|\{i : g \in S_i\}|}, \quad (6)$$

for some fixed $\alpha > 1$. In some embodiments $\alpha$ is randomly chosen to be between 2 and 10. In some embodiments $\alpha$ is about 10. This calculation allows the shortest paths to avoid vertices representing many variables whenever possible, but always finding a path.

In the second stage of method 1000, the finder tries improve the embedding. For example, the finder refines the chains so that no vertex represents more than one variable. It does this by iteratively going through the variables in their order, removing a variable's chain from the embedding, and then reinserting with a better chain. Once the method has gone through all the variables, it checks to see if an improvement has been made. In some embodiments the improvement is measured by: the largest number of variables represented at any vertex; failing that, the sum of the chain sizes; and failing that, the largest size of a chain. In some embodiments the improvement is measured by the largest number of variables represented at any vertex in the hardware graph. That is the bag-width. In some embodiments, the improvement is measured by the sum of the bag for the vertices in the hardware graph. In some embodiments, the measure is the sum of the chain sizes. In some embodiments, the measure is the size of the largest chain for the embedding.

In some embodiments, the measure in the first stage of method 1000 differs from the measure used in the second stage. In some embodiments, the method can be used to improve a measure, such as, minimizing chain lengths of any embedding, regardless of how it was originally found.

Some embodiments have improved ways one can modify the method. These are enumerated. First, note that after selecting a vertex v and shortest paths for a chain $S_i$ to represent variable $x_i$, the vertices on the path from v to a chain $S_j$ could in fact be added to $S_j$ rather than $S_i$. One heuristic for choosing which subgraph to add vertices to is the following: if a vertex g appears in more than one shortest path, say the paths to $S_j$ and $S_k$, then g is added to $S_i$. (This is preferable to adding g to both $S_j$ and $S_k$, as it only increases the number of variables represented at g by 1.) On the other hand, if g appears in only a single shortest path, say the path to $S_j$, then g is added to Sj (as g may lead to shorter paths to the of $x_j$ other than $x_i$). In some embodiments, this heuristic is used to find an embedding and once an embedding is found, however, a different heuristic used. The finder adds vertices to $S_i$ or $S_j$ so as to make the size of the largest chain as small as possible.

Second, when a chain $S_i$ is removed so that the embedding finder can re-embed it, parts of the embeddings of adjacent chains may be removed. During the method 10000 the finder records not just the chains representing each variable but also the paths in the hardware graph representing each edge in the QUBO graph. When $S_i$ is removed, and $x_i$ is adjacent to $x_j$, the finder also removes the part of $S_j$ representing the path from $x_i$ to $x_j$. Recording paths makes the method slower, but it also gives more unused vertices when finding a new chain for $x_i$. In some embodiments the finder use the faster variant of the method to find an initial valid embedding, and then uses the slower variant to minimize chain lengths.

An additional useful representation of the method of FIG. 10 includes the following.

| findChimeraEmbedding |
|---|
| Input: QUBO graph Q with variables $\{x_1, \ldots, x_{|Q|}\}$, hardware graph G<br>Output: Chains $S_1, \ldots, S_{|Q|}$<br>  randomize the variable order $x_1, \ldots, x_{|Q|}$<br>  for i from 1 to \|Q\| do<br>    set $S_i := $ findMinimalChain(G, $\{S_j : j \sim i, j < i\}$)<br>  while $\max_{g \in V(G)}|\{i : g \in S_i\}|$ or $\Sigma_i |S_i|$ or $\max_i |S_i|$ is improving<br>    for i from 1 to \|Q\| do<br>      $S_i := $ findMinimalChain(G, $\{S_j : j \sim i\}$)<br>  return $\{S_1, \ldots, S_{|Q|}\}$ |

| findMinimalChain(G, $\{S_j\}$) |
|---|
| Input: hardware graph G with vertex weights, neighbouring chains $\{S_j\}$<br>Output: Chain S in G such that there is an edge between S and each $S_j$<br>  if $\{S_j\}$ is empty<br>    return random $\{g^*\}$<br>  for all g in V(G) and all j<br>    set c(g, j) := weighted shortest-path distance(g, $S_j$)<br>  set $g^* := \text{argmin}_g \Sigma_j c(g, j)$<br>  return $\{g^*\} \cup \{\text{paths from } g^* \text{ to each } S_j\}$ |

FIG. 11 is a flow-diagram showing an example method 1100 the method 1000. At 1102 receive at the embedding finder a QUBO, Q with an associated a primal graph, G, and a hardware graph $G_H$. In some embodiments, at 1104 randomize the order of variables $\{x_1, \ldots, x_n\}$ from the QUBO problem, Q. In some embodiments, the variables are ordered by increasing index. At 1106 a "first iterative loop" over the variable index starts. The index is incremented by one with each iteration of the "first iterative loop." A search is made to find the minimum weighted chain $S_i$ through unused vertices in the hardware graph $G_H$ from the root of the chain to the existing chains, j<i, associated variables neighbouring the instant variable, i~j. That is, for the variables and associate chains indexed by j such that j is less than current index i and the variables j are neighbours to i in the primal graph. This process is explained below. In some embodiments this completes the first stage of method 1000.

An example of the second stage of method 1000 begins. At 1008 a "while loop" begins. While a measure of embedding is improving the body of the "while loop" iterates. In some embodiments, the "while loop" stops if there has been no improvement since the previous iteration. In some embodiments, the measure of embedding is allowed to worsen for a number of iterations in the hopes it will improve. In some embodiments, the "while loop" terminates after a fixed number of iterations. In some embodiments, the measure is the length of the chain.

At 1110 a "second iterative loop" over the variable index starts. The index is incremented by one with each iteration of the "second iterative loop." A search is made to find the minimum weighted chain $S_i$ through unused vertices in the hardware graph $G_H$ from the root of the chain to all the chains, without restriction on the chain index, associated variables neighbouring the instant variable, i~j. Processing continues in the "second iterative loop" and the "while loop" until respective terminations. At 1112, an embedding is returned. If the method 1100 fails the returned embedding is a decomposition. Recall an embedding is a decomposition with a bag width of 1.

FIG. 12 is a flow-diagram showing an example method 1100 the method 1000. At 1202, the embedding finder receives a set of chains $\{S_i\}$; and a hardware graph $G_H$. At 1204 a test is made to see if the set of chains is empty. If the set is empty, the embedding finder returns a random unused vertex g* $\in$ G. At 1206 the embedding finder enters an "iterative loop", or a "double iterative loop" depending on the implementation, over all the unused vertices in the hardware graph and all the chains in the embedding. In the "iterative loop" or "double iterative loop", the finder calculates the weighted shortest path from all chains to all unused vertices, g. At 1208 the cost of each vertex is calculated. The cost is the sum of weighted shortest path over all chains. At the 210 the finder selects the vertex, g*, with minimum cost. At 1212 the union of the selected vertex g* and the paths from g* to chains $S_j$ that are adjacent to instant chain Si, is returned.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other methods of quantum computation, not necessarily the exemplary methods for quantum computation generally described above.

The various embodiments described above can be combined to provide further embodiments. All of the commonly assigned US patent application publications, US patent applications, foreign patents, foreign patent applications and non-patent publications referred to in this specification and/ or listed in the Application Data Sheet, including but not limited to U.S. Provisional Patent Application Ser. No. 61/738,961, filed Dec. 18, 2012 and U.S. Provisional Patent Application Ser. No. 61/857,993, filed Jul. 14, 2013 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for use in embedding a problem in a target processor, the problem represented as a problem graph having a number of decision variables and the target processor comprising qubits coupleable by couplers and represented as a hardware graph having a plurality of vertices corresponding to qubits coupleable via a number of edges corresponding to couplers, the method comprising:

in a first stage,
successively generating a number of sets of connected subgraphs, each set including a respective subgraph for each decision variable in the problem graph, where adjacent decisions variables in the problem graph are mapped to respective vertices in the hardware graph, the respective vertices which are connected by at least one respective edge in the hardware graph, wherein successively generating a number of sets of connected subgraphs includes using used vertices in the hardware graph to represent the decision variables if no unused vertex in the hardware graph is available; and in a second stage, following the first stage,
refining the connected subgraphs created in the first stage such that no vertex represents more than a single decision variable;
creating a problem formulation executable by the target processor based on the refining of the connected subgraphs; and
transmitting the problem formulation to the target processor for execution by the target processor.

2. The method of claim 1 wherein successively generating a number of sets of connected subgraphs includes using only unused vertices in the hardware graph to represent the decision variables if an unused vertex in the hardware graph is available.

3. The method of claim 1 wherein successively generating a number of sets of connected subgraphs includes using a weighted shortest path determination to find a shortest path that uses only unused vertices of the hardware graph.

4. The method of claim 3 wherein using a weighted shortest path determination includes, for each of at least some of the hardware vertices, exponentially increasing a weight associated with the respective hardware vertex as a function of a total number of decision variables represented by the respective hardware vertex.

5. The method of claim 3 wherein using a weighted shortest path determination includes, for each of at least some of the hardware vertices, exponentially increasing a weight associated with the respective hardware vertex as a function of a fixed value greater than one and a total number of decision variables represented by the respective hardware vertex.

6. The method of claim 3 wherein using a weighted shortest path calculation includes, for each of at least some of the hardware vertices, exponentially increasing a weight associated with the respective hardware vertex as a function of a fixed value between 2 and 10 and a total number of decision variables represented by the respective hardware vertex.

7. The method of claim 3 wherein using a weighted shortest path calculation includes, for each of at least some of the hardware vertices, exponentially increases a weight associated with the respective hardware vertex in accordance with a function given by $$wt(g):=\alpha^{|\{i: g \in S_i\}|}$$

where $\alpha$ is greater than 1.

8. The method of claim 1 wherein refining the connected subgraphs includes:
iteratively for each of the decision variables, in an defined order,
removing the connected subgraph which represents the respective decision variable from the mapping of the problem graph to the hardware graph; and
generating a replacement connected subgraph for the respective decision variable; and
after completing the removing of the connected subgraph and the generating of the replacement connected subgraph for each of the decision variables, determining whether the mapping of the problem graph to the hardware graph is improved relative to at least one previous mapping of the problem graph to the hardware graph.

9. The method of claim 8 wherein determining whether the mapping of the problem graph to the hardware graph is improved relative to at least one previous mapping of the problem graph to the hardware graph includes:
comparing a largest number of decision variables represented at a single vertex, the single vertex representing at least as many decision variables as each other vertex of the hardware graph for each of at least two different mappings of the problem graph to the hardware graph.

10. The method of claim 9 wherein determining whether the mapping of the problem graph to the hardware graph is improved relative to at least one previous mapping of the problem graph to the hardware graph includes:
comparing a total sum of lengths of the connected subgraphs for each of at least two different mappings of the problem graph to the hardware graph.

11. The method of claim 10 wherein determining whether the mapping of the problem graph to the hardware graph is improved relative to at least one previous mapping of the problem graph to the hardware graph includes:
comparing a length of a longest one of the connected subgraphs for each of at least two different mappings of the problem graph to the hardware graph.

12. The method of claim 8, further comprising:
for each of the decision variables, storing information to at least one nontransitory processor-readable medium that identifies the connected subgraphs that represent the respective decision variable; and
storing information to at least one nontransitory processor-readable medium that specifies the paths in the hardware graph that represent each edge in the problem graph.

13. The method of claim 12, further comprising:
based at least in part on stored information, removing at least a portion of an adjacent connected subgraph which is adjacent to one of the connected subgraphs which is being removed.

14. The method of claim 1, further comprising:
determining whether there are any vertices in the hardware graph which represent more than one decision variable in the mapping;
determining whether a total number of iterations has exceeded a define number of iterations; and
terminating the method if at the first of determining that there are no vertices in the hardware graph which represent more than one decision variable in the mapping or the defined number of iterations has been reached.

15. The method of claim 1 wherein the problem graph is a quadratic unconstrained binary optimization (QUBO) graph, the target processor is at least one quantum processor that includes a plurality of qubits and a plurality of couplers, the couplers selectively operable to couple selected ones of the qubits to one another, and further comprising:
embedding the QUBO graph onto the quantum processor.

16. The method of claim 1 wherein the hardware graph is a Chimera graph, the at least one processor includes a digital processor, and successively generating a number of sets of connected subgraphs includes successively generating the sets of connected subgraphs in tiles of the Chimera graph by the digital processor.

17. The method of claim 1 wherein successively generating a number of sets of connected subgraphs includes:
determining by the at least one processor whether a respective vertex appears in more than one shortest connected subgraph; and
if the respective vertex appears in more than one shortest connected subgraph, adding the vertex to a connected subgraph other than the shortest connected subgraphs.

18. A system for use in embedding a problem graph in a hardware graph associated with a target processor comprising qubits coupleable by couplers, the system comprising:
at least one nontransitory processor-readable medium; and
at least one processor communicatively coupled to the at least one nontransitory processor-readable medium, and which in operation executes a first stage and a second stage which follows the first stage,
in the first stage, the at least one processor:
successively generates a number of sets of connected subgraphs, each set including a respective subgraph for each decision variable in a number of decision variables in the problem graph, where adjacent decisions variables in the problem graph are mapped to respective vertices in the hardware graph, the respective vertices which are connected by at least one respective edge in a number of edges in the hardware graph, wherein the at least one processor uses used vertices in the hardware graph to represent the decision variables if no unused vertex in the hardware graph is available to successively generate the number of sets of connected subgraphs, wherein vertices correspond to qubits and edges correspond by couplers; and
in a second stage, the at least one processor:
refines the connected subgraphs created in the first stage such that no vertex represents more than a single decision variable;
creates a problem formulation executable by the target processor based on the refining of the connected subgraphs; and
transmits the problem formulation to the target processor for execution by the target processor.

19. The system of claim 18 wherein the at least one processor uses only unused vertices in the hardware graph to represent the decision variables if an unused vertex in the hardware graph is available to successively generate the number of sets of connected subgraphs.

20. The system of claim 18 wherein the at least one processor uses a weighted shortest path determination to find a shortest path that uses only unused vertices of the hardware graph to successively generate the number of sets of connected subgraphs.

21. The system of claim 20 wherein the at least one processor, for each of at least some of the hardware vertices, exponentially increases a weight associated with the respective hardware vertex as a function of a total number of decision variables represented by the respective hardware vertex to execute the weighted shortest path determination.

22. The system of claim 20 wherein the at least one processor, for each of at least some of the hardware vertices, exponentially increases a weight associated with the respective hardware vertex as a function of a fixed value greater than one and a total number of decision variables represented by the respective hardware vertex to execute the weighted shortest path determination.

23. The system of claim 20 wherein the at least one processor, for each of at least some of the hardware vertices, exponentially increases a weight associated with the respective hardware vertex as a function of a fixed value between 2 and 10 and a total number of decision variables represented by the respective hardware vertex to execute the weighted shortest path calculation.

24. The system of claim 20 wherein the at least one processor, for each of at least some of the hardware vertices, exponentially increases a weight associated with the respective hardware vertex in accordance with a function given by $$Wt(g):=\alpha^{|\{i:g\in S_i\}|}$$

where $\alpha$ is greater than 1.

25. The system of claim 18 wherein to refine the connected subgraphs, the at least one processor:
iteratively for each of the decision variables, in an defined order,
removes the connected subgraph which represents the respective decision variable from the mapping of the problem graph to the hardware graph; and
generates a replacement connected subgraph for the respective decision variable; and
after completing the removal of the connected subgraph and the generation of the replacement connected subgraph for each of the decision variables, the at least one processor determines whether the mapping of the problem graph to the hardware graph is improved relative to at least one previous mapping of the problem graph to the hardware graph.

26. The system of claim 25 wherein to determine whether the mapping of the problem graph to the hardware graph is improved relative to at least one previous mapping of the problem graph to the hardware graph, the at least one processor:
compares a largest number of decision variables represented at a single vertex, the single vertex representing at least as many decision variables as each other vertex of the hardware graph for each of at least two different mappings of the problem graph to the hardware graph.

27. The system of claim 26 wherein to determine whether the mapping of the problem graph to the hardware graph is improved relative to at least one previous mapping of the problem graph to the hardware graph, the at least one processor:
compares a total sum of lengths of the connected subgraphs for each of at least two different mappings of the problem graph to the hardware graph.

28. The system of claim 27 wherein to determine whether the mapping of the problem graph to the hardware graph is improved relative to at least one previous mapping of the problem graph to the hardware graph, the at least one processor:
compares a length of a longest one of the connected subgraphs for each of at least two different mappings of the problem graph to the hardware graph.

29. The system of claim 25 wherein for each of the decision variables, the at least one processor stores information to the at least one nontransitory processor-readable medium that identifies the connected subgraphs that represent the respective decision variable; and stores information to the at least one nontransitory processor-readable medium that specifies the paths in the hardware graph that represent each edge in the problem graph.

30. The system of claim 29 wherein, based at least in part on stored information, the at least one processor removes at least a portion of an adjacent connected subgraph which is adjacent to one of the connected subgraphs which is being removed.

31. The system of claim 18 wherein the at least one processor further:
determines whether there are any vertices in the hardware graph which represent more than one decision variable in the mapping;
determines whether a total number of iterations has exceeded a define number of iterations; and
terminates at an occurrence of the first of a determination that there are no vertices in the hardware graph which represent more than one decision variable in the mapping or the defined number of iterations has been reached.

32. The system of claim 18 wherein the problem graph is a quadratic unconstrained binary optimization (QUBO) graph, the target processor is at least one quantum processor that includes a plurality of qubits and a plurality of couplers, the couplers selectively operable to couple selected ones of the qubits to one another, and wherein the at least one processor causes the QUBO graph to be embedded onto the quantum processor.

33. The system of claim 18 wherein the hardware graph is a Chimera graph, and the at least one processor is a digital processor which successively generates the sets of connected subgraphs in tiles of the Chimera graph to successively generate the number of sets of connected subgraphs.

34. The system of claim 18 wherein to successively generate a number of sets of connected subgraphs, the at least one processor:
determines whether a respective vertex appears in more than one shortest connected subgraph; and
if the respective vertex appears in more than one shortest connected subgraph, the at least one processor adds the vertex to a connected subgraph other than the shortest connected subgraphs.

* * * * *